United States Patent
Tohma

(10) Patent No.: US 8,447,655 B2
(45) Date of Patent: May 21, 2013

(54) DATA PROCESSING APPARATUS

(75) Inventor: Kazuyoshi Tohma, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 943 days.

(21) Appl. No.: 11/408,227

(22) Filed: Apr. 20, 2006

(65) Prior Publication Data

US 2006/0282499 A1    Dec. 14, 2006

(30) Foreign Application Priority Data

Apr. 25, 2005 (JP) .................. 2005-126981
Apr. 25, 2005 (JP) .................. 2005-126988
Apr. 25, 2005 (JP) .................. 2005-127002

(51) Int. Cl.
*G06Q 20/00* (2012.01)
*G06F 7/00* (2006.01)
*G06F 17/30* (2006.01)
*G06G 1/12* (2006.01)

(52) U.S. Cl.
USPC .............................. 705/21; 707/781; 235/383

(58) Field of Classification Search
USPC .............................. 235/383; 705/21; 707/781
See application file for complete search history.

(56) References Cited

U.S. PATENT DOCUMENTS

| | | | | |
|---|---|---|---|---|
| 4,319,326 A | * | 3/1982 | Uchida | 705/21 |
| 4,607,334 A | * | 8/1986 | Shiono et al. | 705/16 |
| 5,845,283 A | * | 12/1998 | Williams et al. | 707/101 |
| 5,889,863 A | * | 3/1999 | Weber | 705/76 |
| 6,622,151 B1 | | 9/2003 | Hamamoto et al. | |
| 6,633,851 B1 | * | 10/2003 | Engler et al. | 705/21 |
| 6,666,373 B2 | * | 12/2003 | Ishikawa | 235/7 R |
| 6,920,506 B2 | | 7/2005 | Barnard et al. | |
| 7,089,425 B2 | * | 8/2006 | Chan | 713/189 |
| 7,454,482 B2 | | 11/2008 | Barnard et al. | |
| 7,480,625 B2 | | 1/2009 | Yajima | |
| 7,609,690 B2 | | 10/2009 | Ogata | |
| 7,810,137 B1 | | 10/2010 | Harvey et al. | |
| 2002/0088849 A1 | * | 7/2002 | Nichols et al. | 235/379 |
| 2002/0091593 A1 | * | 7/2002 | Fowler | 705/28 |
| 2003/0078793 A1 | | 4/2003 | Toth | |
| 2003/0154131 A1 | | 8/2003 | Tsang | |

(Continued)

FOREIGN PATENT DOCUMENTS

| | | |
|---|---|---|
| EP | 1 968 005 A2 | 9/2008 |
| GB | 2 168 515 A | 6/1986 |

(Continued)

OTHER PUBLICATIONS

Braginski "FTP Directories", 2002, available online: http://windowsitpro.com/article/articleid/26637/ftp-directories.html.*

(Continued)

*Primary Examiner* — Brannon W Smith
(74) *Attorney, Agent, or Firm* — Holtz, Holtz, Goodman & Chick, P.C.

(57) ABSTRACT

A data processing apparatus capable of transmitting or receiving file data to or from a server, the apparatus comprises a memory which stores file data, a receiver which receives file name data transmitted from the server, a conversion unit which reads from the memory file data which is indicated by the received file name data, and converts the read file data to file data conforming to a format specified by the file name data, and a transmitter which transmits the converted file data to the server.

5 Claims, 15 Drawing Sheets

U.S. PATENT DOCUMENTS

| | | | |
|---|---|---|---|
| 2004/0208184 A1 | 10/2004 | Tanaka et al. | |
| 2005/0108523 A1* | 5/2005 | West | 713/165 |
| 2005/0242178 A1* | 11/2005 | Minowa | 235/383 |
| 2006/0238799 A1 | 10/2006 | Kidokoro | |
| 2007/0216941 A1 | 9/2007 | Jingu | |
| 2008/0011844 A1* | 1/2008 | Tami et al. | 235/385 |
| 2008/0228608 A1 | 9/2008 | Kurahashi et al. | |
| 2010/0073718 A1 | 3/2010 | Toma | |

FOREIGN PATENT DOCUMENTS

| | | | |
|---|---|---|---|
| GB | 2 407 883 A | 5/2005 |
| JP | 6-168170 A | 6/1994 |
| JP | 10-11380 A | 1/1998 |
| JP | 10-74153 A | 3/1998 |
| JP | 11-053143 A | 2/1999 |
| JP | 2000-132465 A | 5/2000 |
| JP | 2001-14285 A | 1/2001 |
| JP | 2001-243545 A | 9/2001 |
| JP | 2002-140368 A | 5/2002 |
| JP | 2002-149531 A | 5/2002 |
| JP | 2003-67847 A | 3/2003 |
| JP | 2003-150352 A | 5/2003 |
| JP | 2003-158522 A | 5/2003 |
| JP | 2003-307529 A | 10/2003 |
| JP | 2003-323326 A | 11/2003 |
| JP | 2003-337681 A | 11/2003 |
| JP | 2004-133717 A | 4/2004 |
| JP | 2004-208295 A | 7/2004 |
| JP | 2004-246614 A | 9/2004 |
| JP | 2004-272534 A | 9/2004 |
| JP | 2006-050286 A | 2/2006 |

OTHER PUBLICATIONS

Jukka Korpela, "Methods GET and POST in HTML forms—what's the difference?", 2004, available online: http://web.archive.org/web/20040202225809/http://www.cs.tut.fi/~jkorpela/forms/methods.html.*

Web Server Management by IIS, "Network World", Japan IDG Japan, Inc., Jan. 1, 2004, vol. 9, No. 1, pp. 132-137. Partial English Translation provided.

Kazuki Men, Easy Learning of Secure OS by LIDS, "Nikkei Linux", Japan, Nikkei Business Publications, Inc., Mar. 8, 2005, vol. 7, No. 3, pp. 121-125. Partial English Translation provided.

Japanese Office Action dated Jan. 19, 2010 (and English translation thereof) issued in a counterpart Japanese application No. 2005-126981.

Japanese Office Action dated Jan. 26, 2010 (and English translation thereof) issued in a counterpart Japanese application No. 2005-126988.

Japanese Office Action dated Jan. 19, 2010 (and English translation thereof) issued in a counterpart Japanese application No. 2005-127002.

U.S. Appl. No. 12/555,095, filed Sep. 8, 2009, entitled "Sales Data Processing Apparatus, Store Printer System and Computer Program Product," Inventor: K. Toma.

* cited by examiner

ARITHMETIC DATA

| 10 DIGITS | 10 DIGITS |
|---|---|
| SALES QUANTITY | SALES AMOUNT |
| 200 | ¥200,000 |
| 300 | ¥30,000 |
| ⋮ | ⋮ |

| ECRID | RESULT CODE |
|---|---|
| 01 | 00 |
| 02 | 00 |
| ⋮ | ⋮ |
| NM | 01 |

FIG.8

|  | AUTOPGM | X | Z | JOB | ... |
|---|---|---|---|---|---|
| FACULTY FILE (FILE005. DAT) | ○ | ○ | ○ | – | ... |
| PLU FILE (FILE004. DAT) | ○ | ○ | ○ | – | ... |
| IDC FILE (FILE···. DAT) | – | ○ | ○ | – | ... |
| FACULTY COUNTING FILE (FILE×××. DAT) | – | ○ | ○ | – | ... |
| WHOLE SETTING FILE (FILE△△△. DAT) | ○ | – | – | – | ... |
| RESPONSE FILE (FILE○○○. DAT) | – | – | – | ○ | ... |
| ⋮ | ⋮ | ⋮ | ⋮ | ⋮ | ⋮ |

FIG.16A DIR 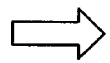
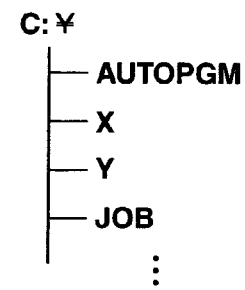
```
C:¥
 ├─ AUTOPGM
 ├─ X
 ├─ Y
 ├─ JOB
 ⋮
```
FIG.16B CD AUTOPGM
DIR 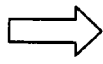
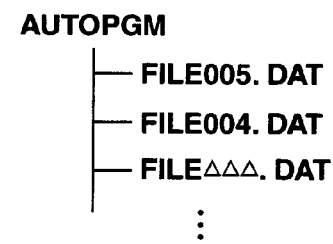
```
AUTOPGM
 ├─ FILE005. DAT
 ├─ FILE004. DAT
 ├─ FILE△△△. DAT
 ⋮
```
FIG.16C CD X
DIR 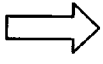
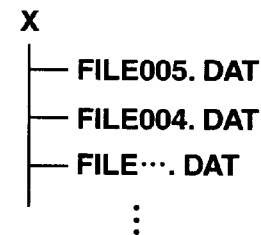
```
X
 ├─ FILE005. DAT
 ├─ FILE004. DAT
 ├─ FILE⋯. DAT
 ⋮
```
FIG.16D CD Z 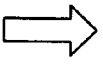
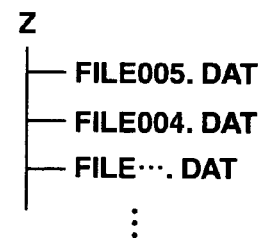
```
Z
 ├─ FILE005. DAT
 ├─ FILE004. DAT
 ├─ FILE⋯. DAT
 ⋮
```
FIG.16E CD JOB
DIR 
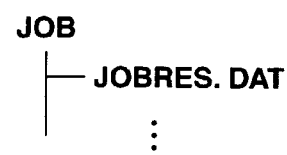
```
JOB
 ├─ JOBRES. DAT
 ⋮
```

DATA PROCESSING APPARATUS

CROSS-REFERENCE TO RELATED APPLICATIONS

This application is based upon and claims the benefit of priority from prior Japanese Patent Applications No. 2005-126981, filed Apr. 25, 2005; No. 2005-126988, filed Apr. 25, 2005; and No. 2005-127002, filed Apr. 25, 2005, the entire contents of all of which are incorporated herein by reference.

BACKGROUND OF THE INVENTION

1. Field of the Invention

The present invention relates to a data processing apparatus for transmitting or receiving file data to or from a server by using a file transfer protocol (FTP).

2. Description of the Related Art

Conventionally, there has been proposed a sales management system for collecting sales data in a data processing apparatus such as an electronic cache register (ECR) or a point-of-sales (POS) terminal in a server located in a data center or the like, and counting the collected sales data. For example, there has been known a sales management assisting apparatus for collecting and storing sales data from a plurality of POS terminals via a local area network (LAN), counting or summing the collected sales data, and transmitting the counted or summed data to a FTP server (refer to Japanese Patent Application KOKAI Publication No. 2003-67847).

In the meantime, conventionally, data is transmitted or received between the ECR and the server by using a dedicated tool or protocol. However, in the case where a function is upgraded or maintenance is carried out, it is necessary to change both the ECR and the server. Therefore, there has been a problem with expandability or ease of maintenance.

On the other hand, when data is transmitted or received between the ECR and the server by using a general-purpose protocol such as FTP, mutually owned file data is merely transmitted or received in accordance with the general-purpose protocol. Therefore, there has been a problem that data failing to conform to a data format is stored in the receiver side. In addition, in the ECR, there exists a file in which set data and arithmetic data such as sales data coexist. However, only transmission and reception in units of files can be carried out in accordance with the general-purpose protocol such as FTP. Therefore, for example, there has been a problem that it is impossible to carry out a processing operation for the server to receive only the arithmetic data contained in the file from the ECR or for the server to transmit only the set data contained in the file to the ECR to rewrite only the set data contained in the file.

In addition, conventionally, in the case where data is transmitted and received between the ECR and the server by using FTP, there is provided a command for referring to a client's directory from the server, and reference can be made to the ECR directory from a personal computer (PC) side. However, this command can refer to only a real directory and a list of file names in each directory, and flexible use such as referring to a list of file names by the contents of the files cannot be carried out.

BRIEF SUMMARY OF THE INVENTION

A first object of the present invention is to enable conversion of only required data contained in a transfer file at the data processing apparatus side so as to be rewritable in a data format according to the receiver side in the case where a file is transmitted or received between a data processing apparatus and a server by using a general-purpose protocol.

A second object of the present invention is to enable referring to file names stored in a data processing apparatus from the server side by the contents of the files in the case where a file is transmitted or received between a data processing apparatus and a server by using a general-purpose protocol.

A third object of the present invention is to enable a data processing apparatus to execute a processing operation of a desired function from the server side after a file has been transmitted or received between the data processing apparatus and the server by using a general-purpose protocol.

According to a first aspect of the present invention, a data processing apparatus capable of transmitting or receiving file data to or from a server, the apparatus comprises:

a memory which stores file data;

a receiver which receives file name data transmitted from the server;

a conversion unit which reads from the memory file data which is indicated by the received file name data, and converts the read file data to file data conforming to a format specified by the file name data; and a transmitter which transmits the converted file data to the server.

According to a second aspect of the present invention, a computer program for a data processing apparatus capable of transmitting or receiving file data to or from a server, the program being stored in a computer readable medium, and the program comprises:

computer readable program code means for causing a computer to store file data into a memory;

computer readable program code means for causing a computer to receive file name data transmitted from the server;

computer readable program code means for causing a computer to read from the memory file data which is indicated by the received file name data, and convert the read file data to file data conforming to a format specified by the file name data; and computer readable program code means for causing a computer to transmit the converted file data to the server.

According to a third aspect of the present invention, a data processing apparatus capable of transmitting or receiving file data to or from a server, the apparatus comprises:

a memory which stores file data;

a receiver which receives a command transmitted from the server;

a control unit which, when the receiver receives a command for browsing a directory of the memory, classifies file data stored in the memory based on file contents, creates virtual directories including file names by classified file data, and transmits data indicating names of the created virtual directories to the server.

According to a fourth aspect of the present invention, a computer program for a data processing apparatus capable of transmitting or receiving file data to or from a server, the program being stored in a computer readable medium, and the program comprises:

computer readable program code means for causing a computer to store file data into a memory;

computer readable program code means for causing a computer to receive a command transmitted from the server;

computer readable program code means for causing a computer to, when a command for browsing a directory of the memory is received, classify file data stored in the memory based on file contents, create virtual directories including file names by classified file data, and transmit data indicating names of the created virtual directories to the server.

According to a fifth aspect of the present invention, a data processing apparatus capable of transmitting or receiving file data to or from a server, the apparatus comprises:

a receiver which receives file name data transmitted from the server; and a control unit which detect a type of a command in the received file, and starts up a processing operation according to the type of the command.

According to a sixth aspect of the present invention, a computer program for a data processing apparatus capable of transmitting or receiving file data to or from a server, the program being stored in a computer readable medium, and the program comprises:

computer readable program code means for causing a computer to receive file name data transmitted from the server; and computer readable program code means for causing a computer to detect a type of a command in the received file, and start up a processing operation according to the type of the command.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention in which:

FIG. 6 is a view showing an example of data storage in a faculty counting file 234 shown in FIG. 3;

FIG. 7 is a view showing an example of data storage in a response file 236 shown in FIG. 3;

FIG. 8 is a view showing an example of a directory (DIR) table stored in the RAM 23;

FIGS. 16A, 16B, 16C, 16D, and 16E are views each showing an example of an entry of the DIR command in the PC 1 shown in FIG. 1 and a virtual directory displayed as a result of such command entry;

FIG. 18 is a view showing a processing sequence among the PC 1, the master ECR 2a, and a slave ECR 2b when a counting processing operation has been started up by a "put" command from the PC 1 to the master ECR 2a.

DETAILED DESCRIPTION OF THE INVENTION

An embodiment of a data processing apparatus according to the present invention will now be described with reference to the accompanying drawings.

Figure 1:
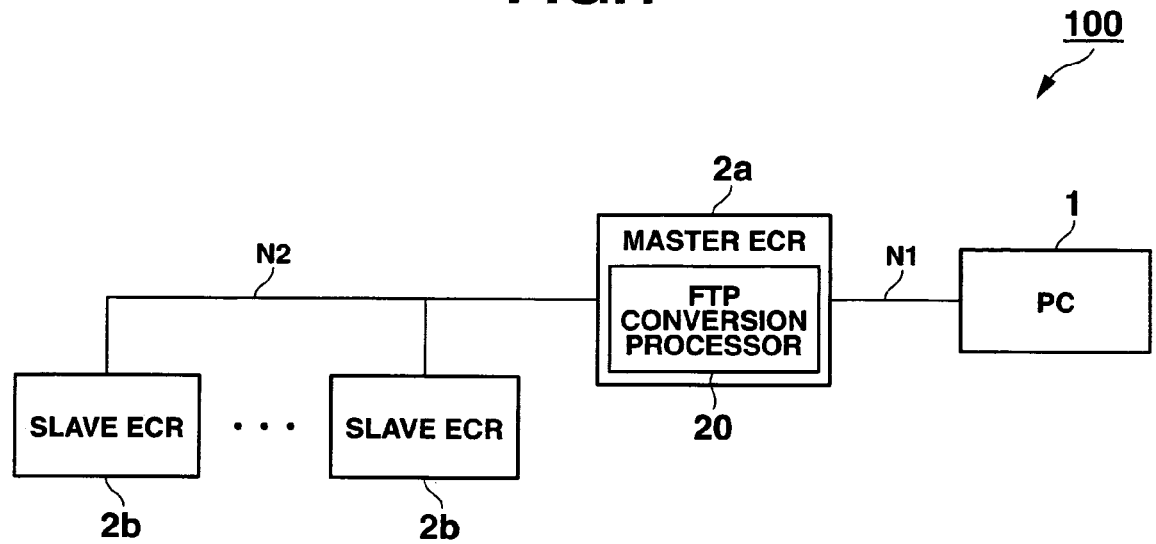
FIG. 1 is a view showing a whole configuration of an ECR system 100 according to an embodiment of the present invention.

FIG. 1 is a view showing a whole configuration of an ECR system 100 in the present embodiment. In the ECR system 100, a PC 1 and a master ECR 2a are connected so that data can be transmitted or received via a communication network N1 such as a local area network (LAN), a wide area network (WAN), or the Internet. The master ECR 2a and slave ECRs 2b are configured to be connected to each other so that data can be transmitted or received via an internal network N2 such as a LAN provided in a shop. The number of devices are not limited in particular. A connection between the PC 1 and the master ECR 2a and a connection between the master ECR 2a and the slave ECRs 2b may be connected in a wired manner or may be connected in a wireless manner.

The PC 1 is provided as a server connected to the master ECR 2a or ECRs 2a in one or more shops via the communication network N1, the server collecting shop sales data (such as commodity sales quantity or sales amount data, for example) from the master ECR 2a or ECRs 2a, and then, carrying out calculation of sales or management analysis of customers' purchasing habits or the like.

The master ECR 2a is provided as a data processing apparatus for carrying out a commodity trading registering processing operation, an inspection processing operation, a sales adjustment processing operation, or a variety of setting processing operations, based on an operator's operation, carrying out collection of sales data from each slave ECR 2b in a shop, and carrying out sales counting in shop. The master ECR 2a has an FTP conversion processor 20, and executes a processing operation in response to a command transmitted from the PC 1 in accordance with the FTP protocol.

The slave ECR 2b carries out a commodity trading registering processing operation, an inspection processing operation, a sales adjustment processing operation, or a variety of setting processing operations and the like, based on an operator's operation, and transmits sales data in response to a request from the master ECR 2a.

Hereinafter, devices configuring the ECR system 100 will be described.

First, a description will be given with respect to the PC 1.

Figure 2:
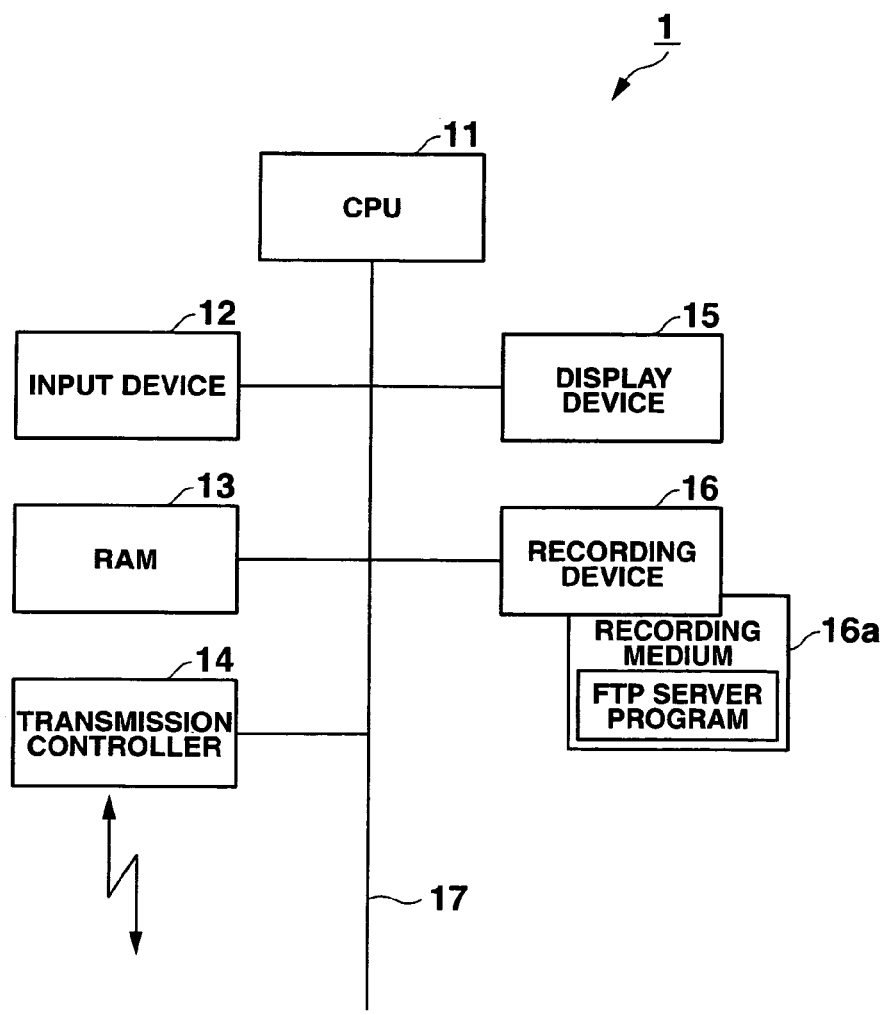
FIG. 2 is a block diagram showing a functional configuration of a PC 1 shown in FIG. 1.

FIG. 2 is a block diagram showing a functional configuration of the PC 1. The PC 1 comprises a central processing unit (CPU) 11, an input device 12, a random access memory (RAM) 13, a transmission controller 14, a display device 15, and a recording device 16 having a recording medium 16a. These devices and units are connected to each other via a bus line 17.

The CPU 11 reads a system program stored in the recording device 16, expands the read out system program in a work area formed in the RAM 13, and controls each device and each unit in the PC 1 in accordance with the system program. The CPU 11 reads a variety of processing programs stored in the recording device 16, expands and executes the read out programs in the work area, and executes a variety of processing operations such as calculation of sales in the ECR system 100.

The CPU 11 reads an FTP server program stored in the storage device 16, expands the read out program in the work area, and transmits or receives file data to or from the master ECR 2a based on the FTP protocol.

The input device 12 comprises a keyboard equipped with alphanumeric input keys, cursor keys, and a variety of functional keys; and a mouse that is a pointing device. A depress signal of a key operated to be depressed on the keyboard and a mouse operating signal are output as input signals to the CPU 11.

The RAM 13 forms a work area for temporarily storing a variety of programs executed by the CPU 11 and data relating to these programs.

The transmission controller 14 comprises a modem, a terminal UP adaptor, a LAN adaptor and the like, and serves as an interface for data transmission or receiving between the transmission controller and the master ECR 2a connected to the communication network N1.

The display device 15 comprises a liquid crystal display (LCD), a cathode ray tube (CRT) and the like, and displays a variety of screens in accordance with a command of a display signal input from the CPU 11.

The recording device 16 has a recording medium 16a having programs, data and the like stored in advance therein, and the recording medium 16a comprises a nonvolatile memory such as a magnetic or optical recording medium or a semiconductor memory. The recording medium 16a is fixedly provided at the recording device 16 or is removably mounted. This recording medium stores a system program compatible with the PC 1, an FTP server program, a variety of processing programs, and a variety of data or the like utilized by these programs.

Now, a description will be given with respect to the master ECR 2a.

Figure 3:
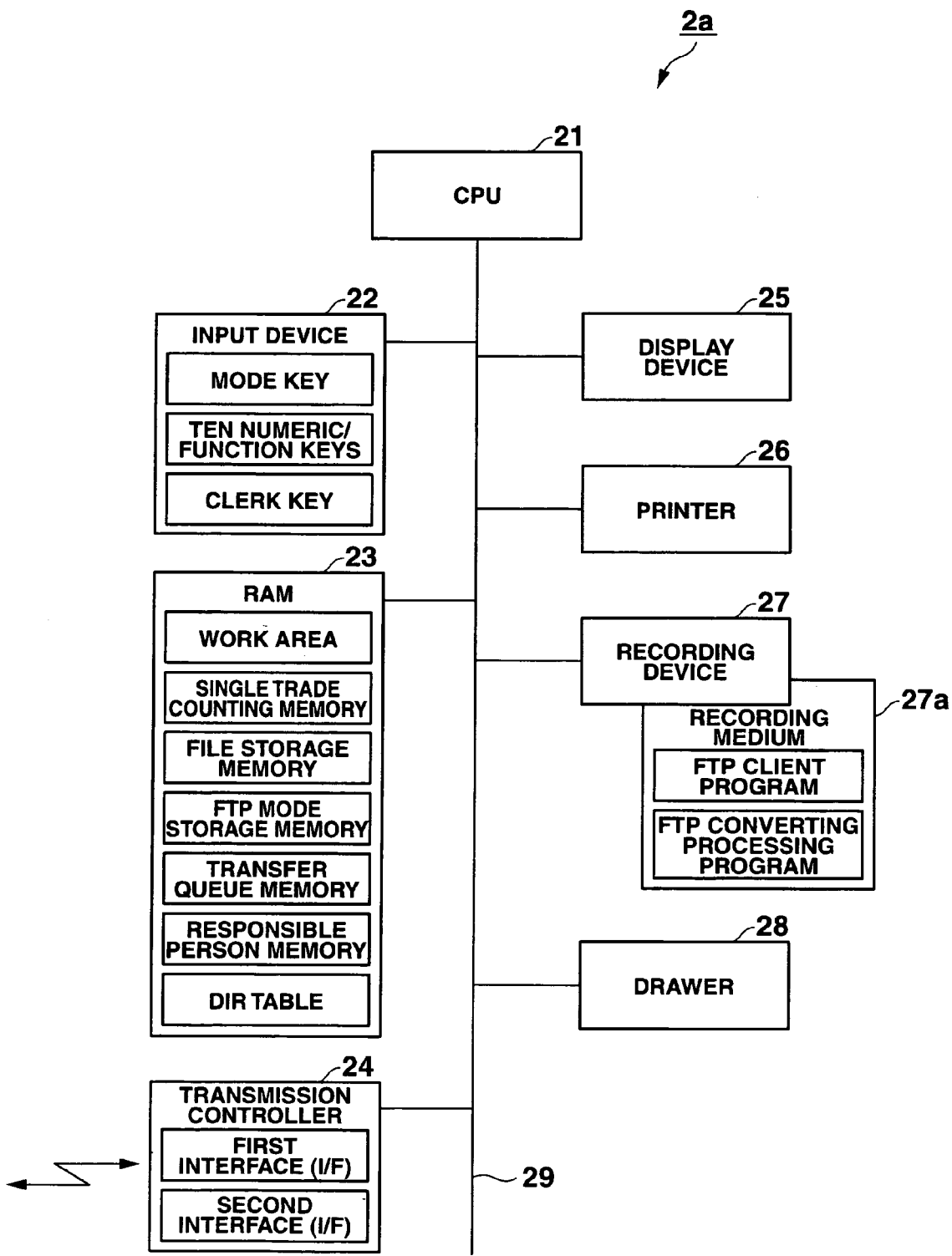
FIG. 3 is a block diagram showing a functional configuration of a master ECR 2a shown in FIG. 1.

FIG. 3 is a block diagram showing a functional configuration of the master ECR 2a. The master ECR 2a comprises a CPU 21, an input device 22, a RAM 23, a transmission controller 24, a display device 25, a printer 26, a recording device 27 having a recording medium 27a, a drawer 28 or the like. These devices and units are connected to each other via a bus line 29.

The CPU 21 is provided as control means. The CPU 21 reads a system program stored in the recording device 27, expands the read out system program in a work area formed in the RAM 23, and controls each device and each unit of the ECR 2a in accordance with the system program. The CPU 21 reads a variety of processing programs such as a main processing program; a registering processing program, a counting processing program, and a variety of FTP converting processing programs ("put" processing program, "get" processing program, CD processing program, and DIR processing program); expands them in the work area; and executes a variety of processing operations including a main processing operation (referring to FIG. 9), a registering processing operation (referring to FIG. 10), a counting processing operation (referring to FIG. 12), a "put" processing operation (referring to FIG. 11), a "get" processing operation (referring to FIG. 13), a CD processing operation (referring to FIG. 14), and a DIR processing operation (referring to FIG. 15) described later.

The CPU 21 achieves the FTP conversion processor 20 in accordance with a software processing operation under cooperation with a variety of FTP converting processing programs.

The CPU 21 reads an FTP client program stored in the storage device 27, expands and executes the read out program in the work area, and transmits or receives file data to or from the PC 1 based on the FTP protocol.

The input device 22 comprises mode keys, numeric/function keys, a clerk key and the like, and outputs to the CPU 21 an operating signal in response to each key operation.

The mode keys are provided as keys for specifying a desired mode from among a registering mode for registering sales data; a return mode for carrying out return processing operation; an inspection mode for inspecting registered sales data (hereinafter, referred to as an "x" mode); a sales adjustment mode for reading out registered sales data and resetting sales data excluding set data (hereinafter, referred to as a "z" mode); a set mode for providing a variety of environment settings of the master ECR 2a and the slave ECR 2b (hereinafter, referred to as an AUTOPGM mode); and an "off" mode for terminating each operating mode and stopping operation.

The numeric/function keys comprise numeric keys for inputting numeric values; character keys for inputting characters; and function keys for instructing a variety of functions.

The clerk key is provided as a key for identifying an operator who operates the master ECR 2a.

The RAM 23 forms a work area for temporarily storing a system program executed by the CPU 21, a variety of processing programs, data being processed in each processing operation, a processing result and the like. The RAM 23, as shown in FIG. 3, has a single trade totaling memory for temporarily storing trade total amount data on one trade that has been processed in advance.

Figure 4:
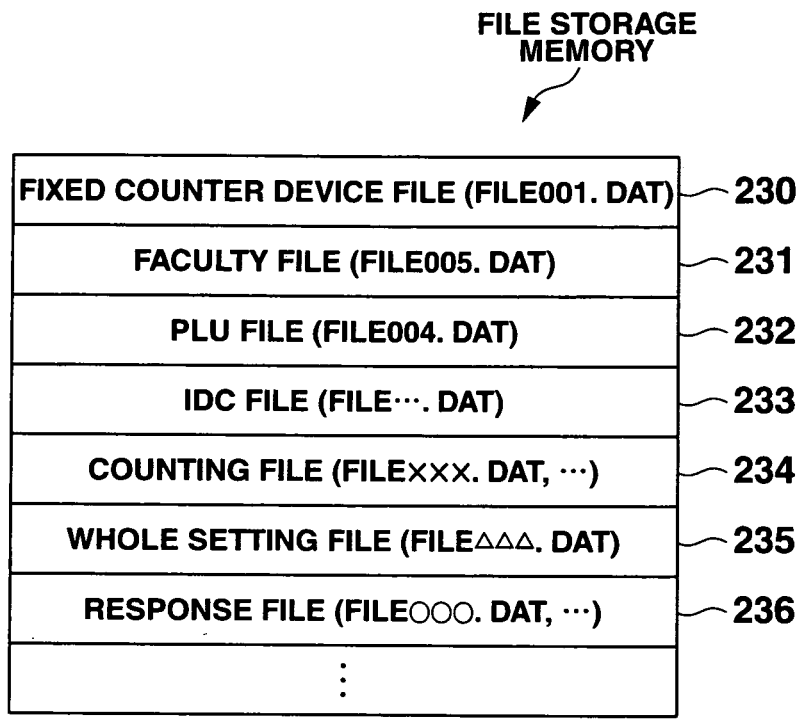
FIG. 4 is a view showing an example of a file stored in a file storage memory of a RAM 23 shown in FIG. 3.

The RAM 23 has a file storage memory serving as storage means for storing a variety of file data such as sales data based on registering, counting data on counting sales data, and a variety of set data. A file storage memory, as shown in FIG. 4, for example, stores a fixed counter device file 230, a faculty file 231 for storing sales data by commodity faculty, a price look up (PLU) file 232 for storing sales data by commodity; an item data capture (IDC) file 233 for storing data on sales details; a counting file 234 for storing a counting result of sales data on the master ECR 2a and each slave ECR 2b (such as faculty counting file having summed faculty files of each ECR); a total setting file 235 for storing a variety of set data and the like. The file storage memory has a response file 236 or the like for storing an error code when an error occurs with a job such as a counting processing operation.

Hereinafter, a description will be given with respect to a faculty file 231, a counting file 234, and a response file 236 as an example of a file stored in a file storage memory.

Figure 5:
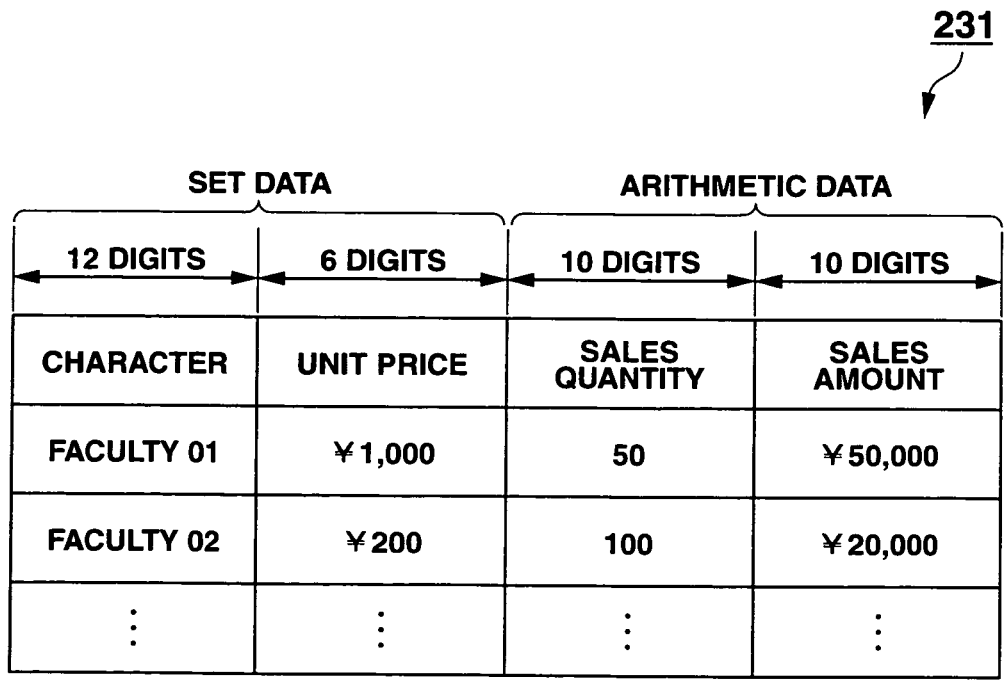
FIG. 5 is a view showing an example of data storage in a faculty file 231 shown in FIG. 3.

FIG. 5 is a view schematically showing an example of data storage in the faculty file 231. The faculty file 231 has: a character region for storing character string (character) data on a faculty type (hereinafter, region is referred to as a field); a unit price field for storing unit price data; a sales quantity field for storing data on sales quantity; and a sales amount field for storing sales amount data. The character, unit price, sales quantity, and sales amount relating to each faculty are stored as one record in association with each other. Data on each field is expressed in a fixed length, as shown in FIG. 5, and can identify a field to be stored in the number of data digits. The data stored in the character field and the unit price field are predetermined set data, and the data stored in the sales quantity field and the sales amount field are arithmetic data (counter device) to be accumulated and added up every time a commodity of the corresponding faculty is registered.

FIG. 6 is a view schematically showing an example of data storage in a faculty counting file as an example of the counting file 234. This faculty counting file has: a sales quantity field for storing a result of counting data on sales quantity of the faculty files 231 in all ECRs connected to the communication network N2 on a record by record basis; and a sales amount field for storing a result of counting sale amount data on the facility files 231 in all ECRs connected to the communication network N2 on a record by record basis.

In files having the same name stored in the master ECR 2a and each slave ECR 2b, a positional relationship between fields and the corresponding number of digits in the fields are identical to each other. In files having the same name stored in the master ECR 2a and each slave ECR 2b, the storage regions of records are associated with each other. For example, in the faculty file 231 stored in the master ECR 2a, if data relating to "faculty 01" is stored in the first record, as shown in FIG. 5, data relating to "faculty 01" is stored in the first record in all the slave ECRs 2b. In a counting file having summed individual files in each ECR as well, the storage regions of records are associated with each other. For example, records in the faculty file 231 are associated with records in a faculty counting file, and a result of counting first records in the faculty files 231 in all ECRs is stored in the first record of the faculty counting file.

The counting files 234 can include: a fixed counter device counting file having summed fixed counter device file 230 of each ECR, for example; a PLU counting file having summed PLU file 232 of each ECR; a time interval file for counting sales amount by time intervals, and the like.

File data contained in a file storage memory is expressed in a fully fixed length as has been described in the faculty file 231 shown in FIG. 5, making it possible to identify a field to be stored in each file in accordance with the number of data digits.

FIG. 7 is a schematic view showing an example of data storage in the response file 236. The response file 236 stores data indicating a startup result of each job, and is generated on a job by job basis. For example, FIG. 7 shows the response file 236 for storing a job startup result of a counting processing operation shown in FIG. 12. This file stores an ECR identifier (ID) for identifying each ECR that has been abnormally ended and an error code indicating type of error that has occurred with that ECR (such as "00" if data cannot be transmitted during a registering operation, for example) in association with each other. The present embodiment assumes that only a job that has been abnormally ended is stored as a job startup result. By providing a normal code indicating that a job has been abnormally ended, a result of both normal and abnormal ends may be stored in the response file 236.

The RAM 23 has an FTP mode storage memory for storing types of FTP modes specified by a CD processing operation (referring to FIG. 14) described later ("x" mode, "z" mode, AUTOPGM mode, "job" mode, or no specified mode). A REG (register) mode is to register sale data, an RF mode is to perform a return goods processing, an "x" mode is to check the registered sale data, a "z" mode is to read the registered sale data and to reset sale data excluding setting data, an "AUTOPGM" mode is to set environmental settings of the master ECR 2a and the slave ECR 2b, and an OFF mode is to stop operations of the above modes. The FTP modes are provided as operating modes applied when carrying out a processing operation (such as "get" processing operation (referring to FIG. 13) described later) in response to a command received from the PC 1 in accordance with the FTP protocol.

The RAM 23 stores a DIR (directory) reference table.

This DIR table, as shown in FIG. 8, is provided as a table which lists whether or not the contents of files stored in the file storage memory of the RAM 23 can be accessed (read out and/or written) from the PC 1 in each FTP mode. As shown in the DIR table, files accessible from the PC 1 are predetermined in each FTP mode in accordance with the contents of each file. In an AUTOPGM mode, an access can be provided to a file containing set data in its contents. In an "x" mode, an access can be provided to a file containing arithmetic data in its contents. In a "z" mode, an access can be provided to a file containing arithmetic data that can be cleared as zero. In a "job" mode (described later in detail), an access can be provided to only the response file 236.

The contents of the DIR table are properly rewritten in accordance with a time interval by means of the CPU 21. For example, in the case where unit price data cannot be changed in the morning, an access to the faculty file 231 and the PLU file 232 is rewritten as "disable" during the AUTOPGM mode in the DIR table in the morning, and it is displayed that an access is impossible. During opening hours, in the case where sales adjustment from the PC 1 cannot be accepted, an access to each file is rewritten as "disable" in the "z" mode until a predetermined time interval has been established, and it is displayed that an access is disabled.

The RAM 23 has a transfer wait memory for temporarily storing conversion data queued to be transferred during a "get" processing operation described later and a responsible person memory for storing a responsible person code of a current operator in response to an operation of the clerk key of the input device 22.

Turning back to FIG. 3, the transmission controller 24 comprises a modem and a terminal up adaptor or a LAN adaptor or the like as receiving means and transmitting means. This controller 24 has a first interface (I/F) adapted to transmit or receive data to or from the PC 1 via the communication network N1; and a second I/F comprising a LAN adaptor or the like, and adapted to transmit or receive data to or from each slave ECR 2b via the communication network N2.

The display device 25 comprises a liquid crystal display (LCD) or the like, and displays a variety of computation results, program contents, set guidance or the like in accordance with a variety of instructions input from the CPU 21.

The printer 26 is provided as a thermal printer, for example, and has roll paper for receipt or journal (for recording the contents of commodity registering). This printer 26 prints out amount data such as a variety of sales data and subtotal data onto each roll paper as sales details.

The recording device 27 has a recording medium 27a in which programs, data and the like have been stored in advance. This recording medium 27a comprises a magnetic or optical recording medium or a nonvolatile memory such as a semiconductor memory. The recording medium 27a is fixedly provided in the recording device 27 or is removably mounted. This recording medium 27a stores in advance a variety of processing programs such as a system program compatible with the master ECR 2a, an FTP client program, a master processing program, a registering processing program, a counting processing program, and a variety of FTP converting processing programs, and a variety of data utilized by these programs.

The drawer 28 is provided as a drawer for storing cash.

A functional configuration of the slave ECR 2b is similar to that of the above-described master ECR 2a. Like constituent elements are designated by the same reference numerals. A duplicate description is omitted here. In the present embodiment, the slave ECR 2*b* does not transfer a file to the PC 1, and thus, there is no need for storing FTP client program and FTP converting processing program in the recording device 27. In addition, an interface for making connection to the communication network N1 may not be provided in the transmission controller 24.

Now, an operation of the present embodiment will be described here.

Figure 9:
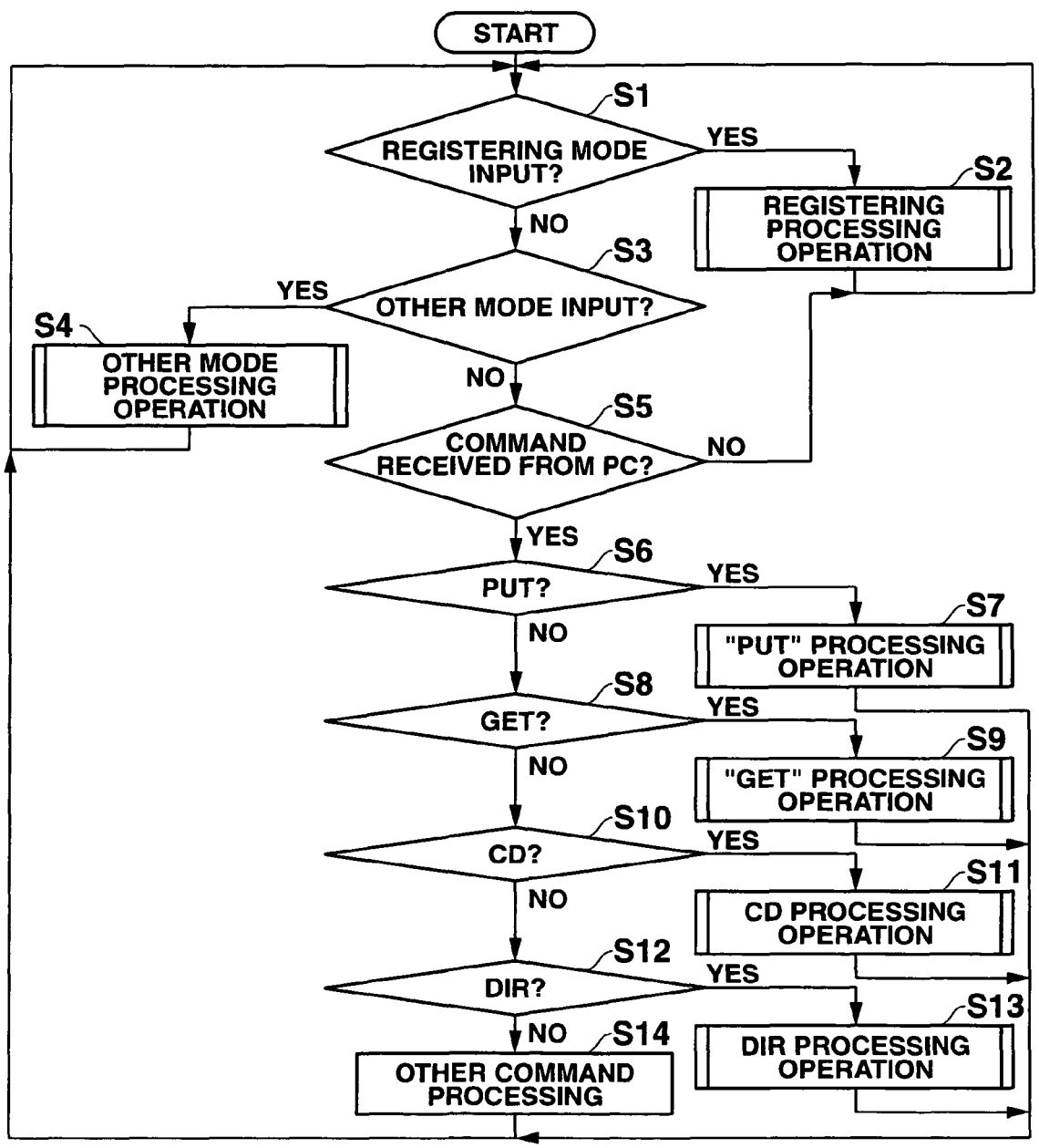
FIG. 9 is a flowchart showing a main processing operation executed by a CPU 21 shown in FIG. 3.

FIG. 9 is a flowchart showing a main processing operation executed by the CPU 21 of the master ECR 2*a*. The processing operation is provided as a processing operation achieved by a software processing operation under cooperation with a main processing program stored in the CPU 21 and the recording device 27 when the master ECR 2*a* is powered on.

Figure 10:
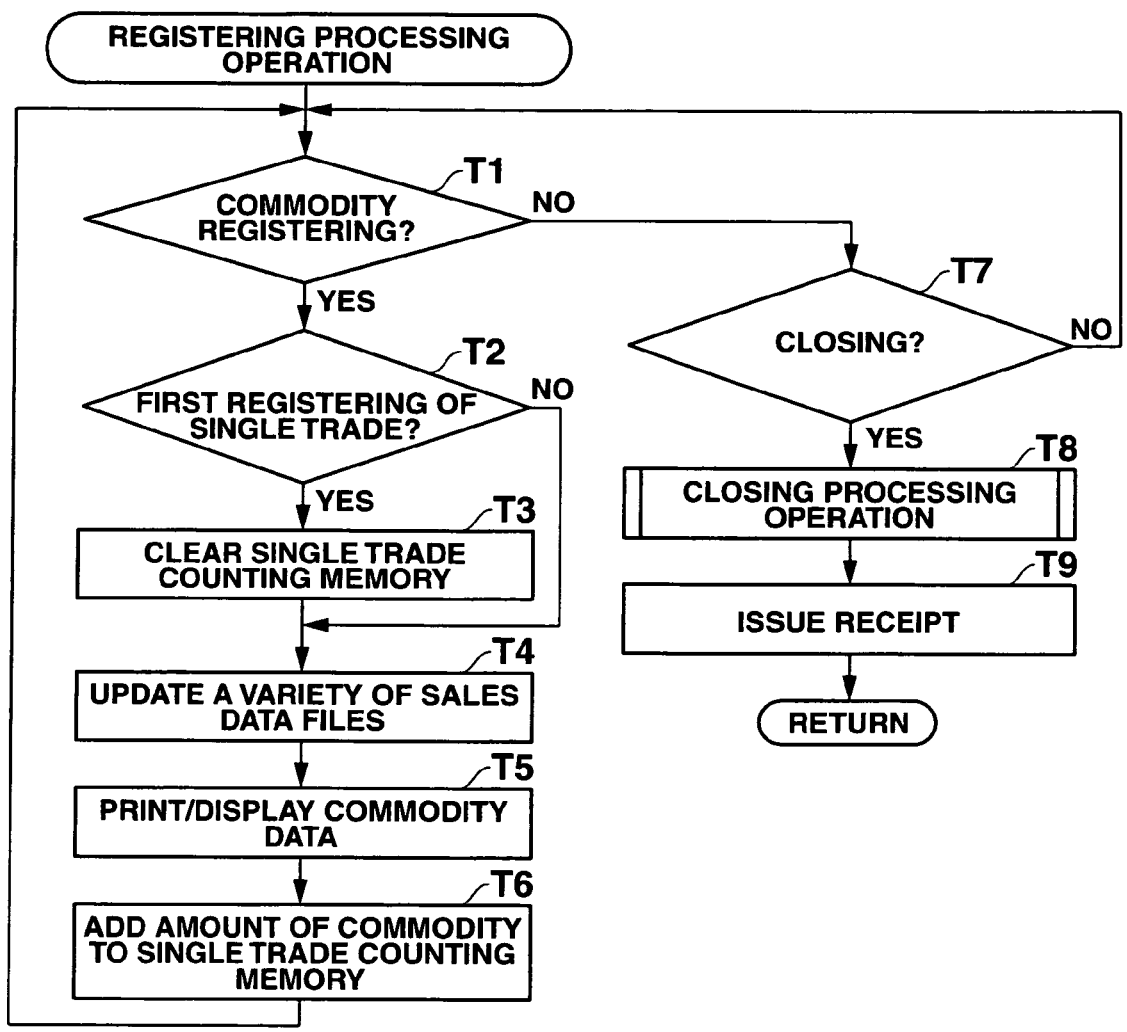
FIG. 10 is a flowchart showing a registering processing operation executed by the CPU 21.

When a registering mode is specified by a mode key of the input device 22, and then, an input is carried out in the registering mode (yes in step S1), a registering processing operation shown in FIG. 10 is executed (step S2).

FIG. 10 is a flowchart showing a registering processing operation (step S2) executed by the CPU 21 of the master ECR 2*a*. The processing operation is achieved by a software processing operation under the cooperation between the CPU 21 of the master ECR 2*a* and a registering processing program stored in the recording device 27.

When an input is carried out by the input device 22, it is determined whether or not the input is instructed to register a commodity. In the case where it has been determined that the input is instructed to register a commodity (yes in step T1), it is determined that whether or not this commodity registration is the first commodity registration of one trade (step T2). In the case where it has been determined that the registration is the first commodity registration of such one trade (yes in step T2), a total memory of one trade in the RAM 23 is cleared (step T3). A variety of sales data files such as the fixed counter device file 230, faculty file 231, and PLU file 22 are updated (step T4), and commodity data such as a commodity name (commodity code) or a sales amount is printed on a receipt and a journal by means of the printer 26. In addition, the data is displayed on the display device 25 (step T5); a sales amount of a commodity is added in a single trade counter memory of the RAM 23 (step T6); and current processing reverts to step T1.

On the other hand, if it is determined that the input from the input device 22 is not instructed to register a commodity (no in step T1), it is determined whether or not the input is instructed for a closing processing operation (step T7). In the case where it has been determined that the input is instructed for the closing processing operation (yes in step T7), the closing processing operation is executed (step T8). That is, a single trade total amount stored in the single trade counter memory is read out, and is displayed on the display device 25. Calculation or the like of an amount of changes is also carried out based on an amount of received money. When the closing processing operation terminates, a receipt is issued by means of the printer 26 (step T9), and current processing reverts to step S1 shown in FIG. 9.

In step S1 shown in FIG. 9, in the case where an input in the registering mode is not carried out by means of the input device 22 (no in step S1), and then, an input in another operating mode has been made (yes in step S3), a processing operation in such another operating mode is executed based on the input (step S4).

Figure 11:
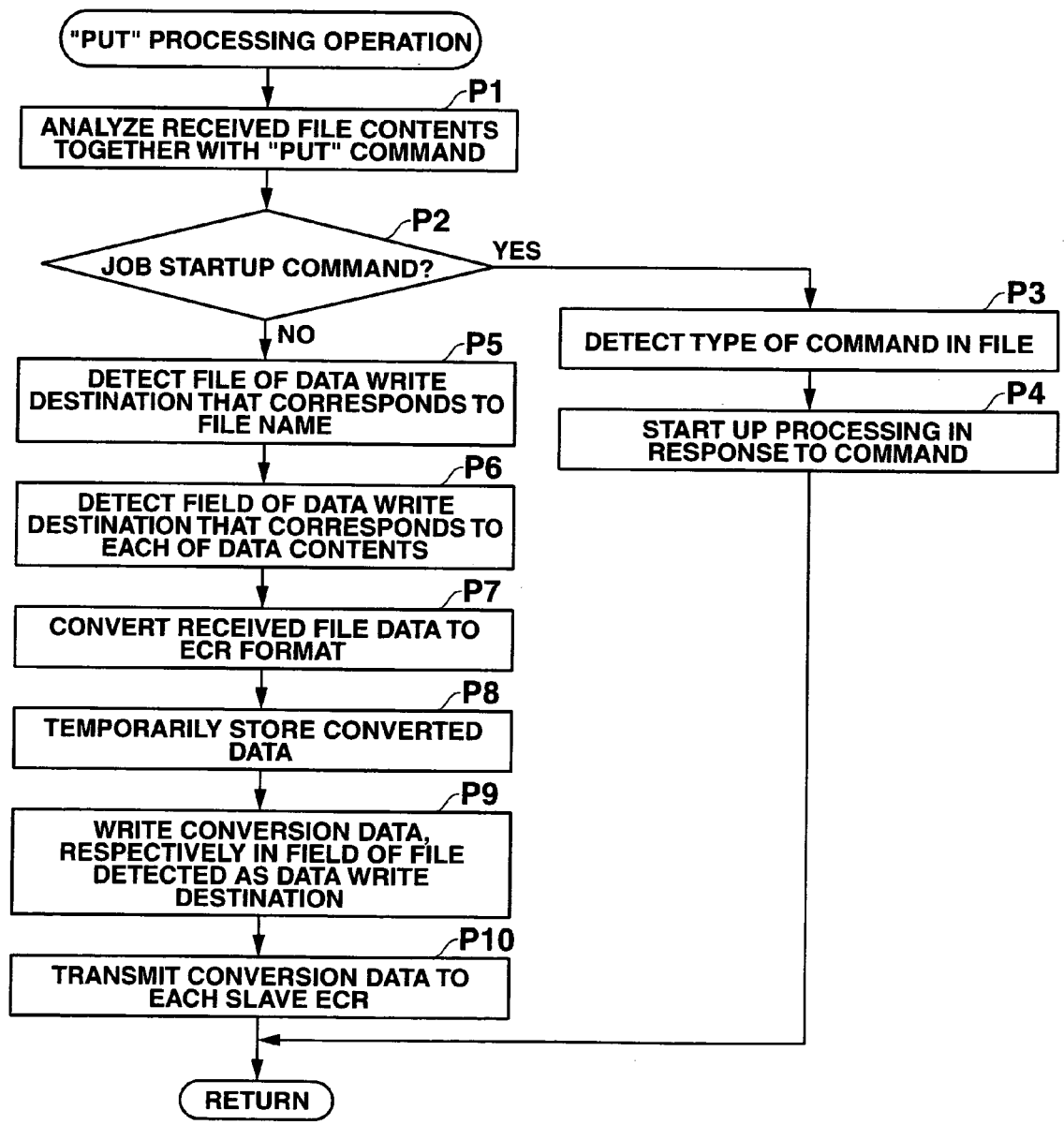
FIG. 11 is a flowchart showing a "put" processing operation executed by the CPU 21.

On the other hand, in the case where an input in the registering mode and an input in another mode are not carried out, and a non-processing state is established (no in step S3), it is determined whether or not a command has been received based on the FTP protocol from the PC 1 via the transmission controller 24 (step S5). If the command is not received (no in step S5), current processing reverts to step S1. In the case where it is determined that the command from the PC 1 has been received (yes in step S5), the type of the received command is determined. When it is determined that the received command is a "put" command (yes in step S6), a "put" processing operation shown in FIG. 11 is executed (step S7), and current processing reverts to step S1.

Figure 13:
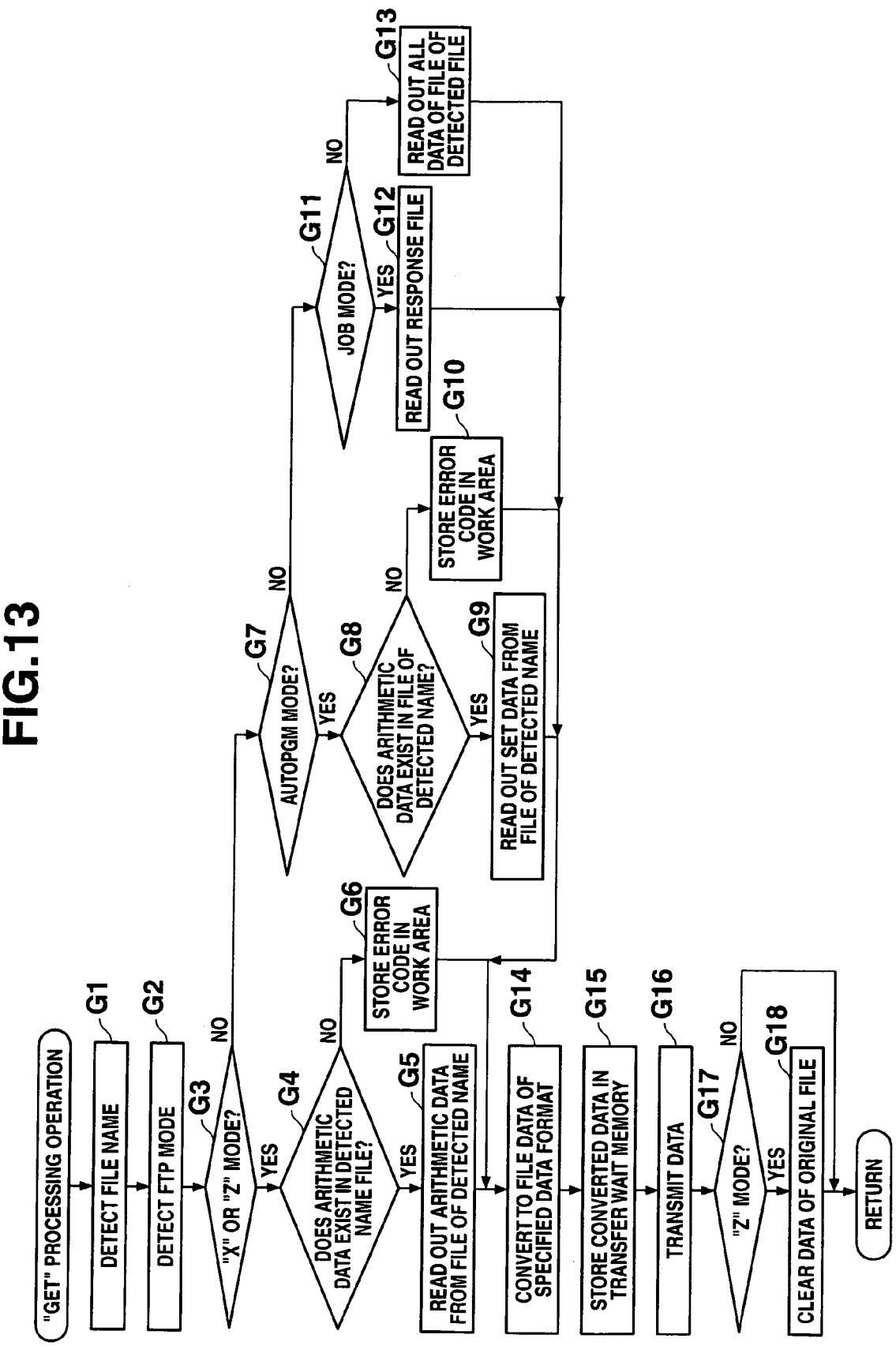
FIG. 13 is a flowchart showing a "get" processing operation executed by the CPU 21.

When it is determined that the received command is not the "put" command (no in step S6), and then, it is determined that the command is a "get" command (yes in step S8), a "get" processing operation shown in FIG. 13 is executed (step 9), and current processing reverts to S1.

Figure 14:
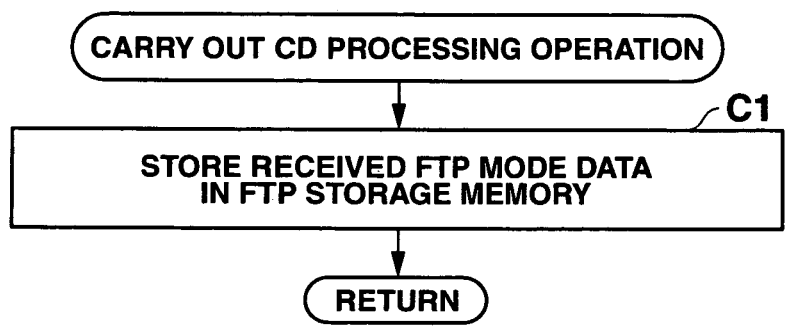
FIG. 14 is a flowchart showing a CD (change directory) processing operation executed by the CPU 21.

When it is determined that the received command is not the "get" command (no in step S8), and then, it is determined that the command is a CD command (yes in step S10), a CD processing operation shown in FIG. 14 is executed (step S11), and current processing reverts to step S1.

Figure 15:
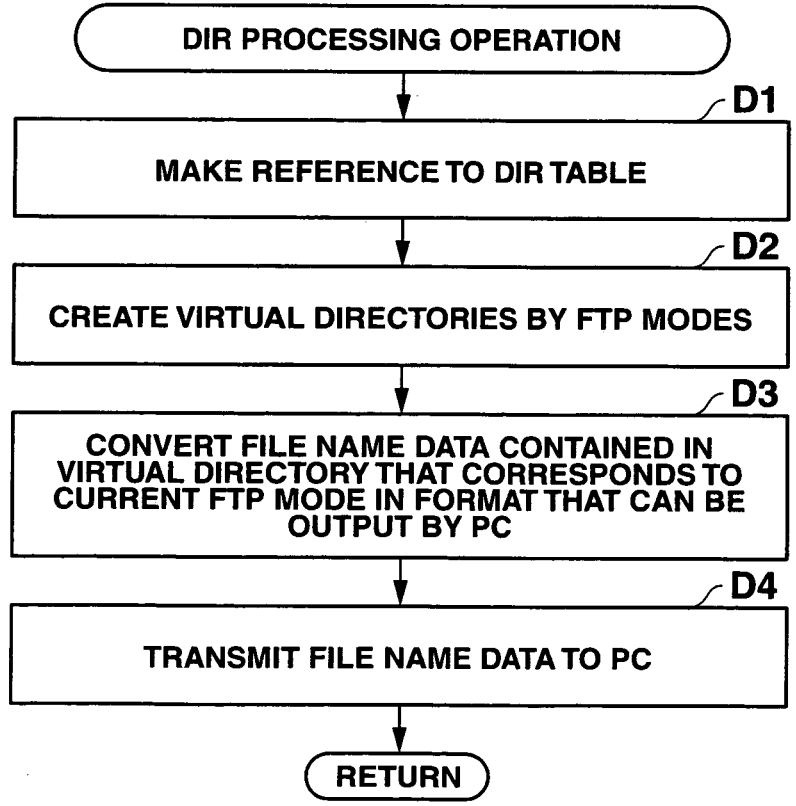
FIG. 15 is a flowchart showing a DIR (directory) processing operation executed by the CPU 21.

When it is determined that the received command is not the CD command (no in step S10), and then, it is determined that the command is a DIR command (yes in step S12), a DIR processing operation shown in FIG. 15 is executed (step S13), and current processing reverts to step S1.

When it is determined that the received command is not the DIR command (no in step S12), a processing operation in response to the received other command is executed (step S14), and current processing reverts to step S1.

Hereinafter, a description will be given with respect to each one of a "put" processing operation, a "get" processing operation, a CD processing operation, and a DIR processing operation executed in response to a command based on the FTP protocol from the PC 1.

"Put" Processing Operation

First, a description will be given with respect to a "put" processing operation.

FIG. 11 is a flowchart showing a "put" processing operation executed by the CPU 21 of the master ECR 2*a*. The processing operation is achieved by a software processing operation under the cooperation between the CPU 21 of the master ECR 2*a* and a "put" processing program stored in the recording device 27.

The content of file data received together with a "put" command by the PC 1 is analyzed (step P1). As a result of this analysis, in the case where it has been determined that the content of the received file data is a job startup command (yes in step P2), a type of command in the received file is determined (step P3); a processing operation (job) according to the type of the command is started up (step P4); and current processing reverts to step S1 shown in FIG. 4.

For example, after a file "PUT JOBSEND.TXT" transmitted from the PC 1 has been received, in the case where a result of analyzing its contents is a job startup command indicating a counting processing operation of the fixed counter device file 230 called "J 21 X11 REPORT", the counting processing operation of the fixed counter file 230 is started up. In this way, file data describing a job startup command from the PC 1 in accordance with the FTP protocol is transmitted to the ECR 2*a*, thereby making it possible to apply job startup from the PC 1 to the ECR 2*a*.

Figure 12:
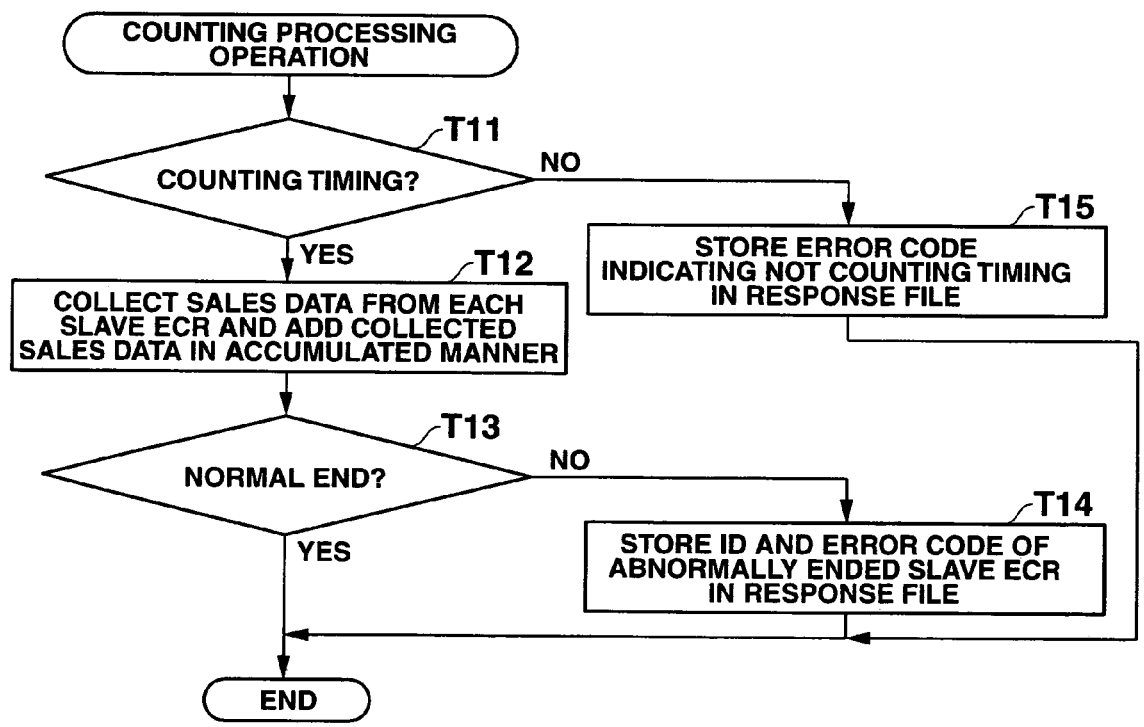
FIG. 12 is a flowchart showing a counting processing operation executed by the CPU 21.

FIG. 12 is a flowchart showing a counting processing operation as an example of a processing operation started up by a job startup command.

First, it is determined whether or not a counting timing is established (step T11). In the case where it is determined that the counting timing is established (yes in step T11), sales data contained in a file specified by a command from each slave ECR 2b is collected, and is added in an accumulated manner (step T12). In more detail, a command for collecting sales data in a file specified by a job startup command with respect to each slave ECR 2b (for example, the fixed counter device file 230 in the case of "J 21 X11 REPORT" described above) is transmitted. In each slave ECR 2b, when the sales data collecting command has been received, the sales data is read out from the specified file, the read out sales data is transmitted to the master ECR 2a, and the read out sales data is cleared (zero-cleared) from the specified file. When the sales data contained in the specified file has been received from each slave ECR 2b, the received sales data and the sales data contained in the specified files of the master ECR 2a are added in an accumulated manner in a corresponding field of the counting file 234.

When counting of the sales data is normally ended (yes in step T13), this processing operation terminates. In the case where sales data has not been successfully received and counting of the sales data is abnormally ended due to the fact that any slave ECR 2b is powered OFF, a registering processing operation is in progress, or a communication error occurs (no in step T13), an identification code (id) of the abnormally ended slave ECR 2b and an error code according to an error state are stored in the response file 236 of the RAM 23 (step T14), and the processing operation terminates.

On the other hand, in the case where the counting timing is not established (for example, in the case where a working time is in progress) (no in step T11), an error code indicating that the counting timing is not established is stored in the response file 236 (step T15), and the processing operation terminates.

In addition to the above-described counting processing operation, the jobs that can be started up from the PC 1 can include: a "z" locking processing operation for disabling an operator's registration; a "z" unlocking processing operation for releasing the "z" lock; a batch maintenance processing operation; an auto power ON/OFF processing operation for automatically turning power on or off, and the like. The "z" locking operation is to prohibit the operation of the ECR in order to clear the ECR and other PCs.

Turning to FIG. 11, in the case where the content of the received file is not a job startup command as a result of the analysis in step P1 (no in step P2), a file being a destination of writing the received file data is determined from a file name of the received file data (step P5); a field for writing the data received from the contents of data contained in the received file is determined (step P6); the data contained in the received file is converted to data conforming to a predetermined ECR format (step P7); and the converted data is temporarily stored in a work area of the RAM 23 (step P8). For example, in the case where a file having a file name "FILE005.txt" of a faculty file has been received from the PC 1, it is determined, based on the file name, that a file name of a write destination is a faculty file "FILE005.DAT" stored in the RAM 23, and there is a need for conversion from text data to binary data. In addition, a field for writing each item of data is determined based on the contents of each item of data contained in the received file, specifically based on a length of each item of data and types of data (such as character or numeric data).

After conversion, conversion data temporarily stored in the RAM 23 is written in a write destination field of the write destination file determined in step P5 and step P6 (step P9). Then, the conversion data temporarily stored in the RAM 23 is transmitted so that the write destination file and field can be identified with respect to each slave ECR 2b via the second I/F of the transmission controller 24 (step P10), and current processing reverts to step S1 shown in FIG. 9.

As described above, by using a "put" command in accordance with the FTP protocol, the data to be written into files stored in the master ECR 2a and the slave ECR 2b (such as set data, for example) is transmitted from the PC 1 to the master ECR 2a. As a result, the current data is converted into data conforming to an ECR format on the ECR, and a region to be written, i.e., a file name and a field to be written is determined and written, thus making it possible to easily write set data into the master ECR 2a and the slave ECR 2b from the PC 1 by using a general-purpose protocol such as FTP.

"Get" Processing Operation

Now, a description will be given with respect to a "get" processing operation.

FIG. 13 is a flowchart showing a "get" processing executed by the CPU 21 of the master ECR 2a. The processing is achieved by a software processing operation under the cooperation between the CPU 21 of the master ECR 2a and a "get" processing program stored in the recording device 27.

Here, a "get" command is a command transmitted when it is required to obtain file data stored in the master ECR 2a from the PC 1. On the master ECR 2a, if an FTP mode is specified in advance by a CD command from the PC 1, the data according to the FTP mode can be transmitted from a file requested from the PC 1.

First, the contents of data indicating a file name received together with a "get" command from the PC 1 is determined (step G1), and FTP mode data stored in an FTP mode storage memory is determined (step G2). The FTP mode storage memory stores data indicating an FTP mode specified by the CD command transmitted from the PC 1 (referring to FIG. 14). In the case where an FTP mode determined in step G2 is an "x" mode or a "z" mode (yes in step G3), it is determined whether or not arithmetic data is stored in a file whose file name is determined in step G1 from among the files stored in the file storage memory of the RAM 23. In the case where it is determined that the arithmetic data is stored (yes in step G4), the arithmetic data is read out from the determined file, the read out data is temporarily stored in a work area (step G5); and current processing moves to step G14.

In step G4, in the case where it has been determined that the arithmetic data is not stored in a file whose file name is determined in step G1 (no in step G4), a file indicating a mode error is temporarily stored in the work area (step G6), and current processing moves to step G14.

In the case where the FTP mode determined in step G2 is neither the "x" mode nor the "z" mode (no in step G3), it is determined whether or not the FTP mode is an AUTOPGM mode (step G7). In the case where the above mode is the AUTOPGM mode (yes in step G7), it is determined whether or not set data is stored in a file whose file name is determined in step G1 (step G8). In the case where it is determined that the set data is stored (yes in step G8), the set data is read out from the determined file; the read out data is temporarily stored in the work area (step G9); and current processing moves to step G14.

On the other hand, in the case where it has been determined that the set data is not stored in a file whose file name is determined in step G1 (no in step G8), a file indicating a mode error is created; the created file is temporarily stored in the work area (step G10); and current processing moves to step G14.

Further, in the case where the FTP mode determined in step G2 is not the AUTOPGM mode (no in step G7), and it is determined that the mode is a JOB mode (yes in step G11), the response file 236 is read out (step G12), and current processing moves to step G14.

Further, in the case where the FTP mode determined in step G2 is not a JOB mode (no in step G11), i.e., in the case where no mode is specified, all data is read out from a file whose file name is determined in step G1; the read out data is temporarily stored in the work area; and current processing moves to step G14.

In step G14, the data read out in the work area is converted to a file format specified from the PC 1, and the converted data is stored in a transfer area of the RAM 23 (step G15). The file format specified by the PC 1 is determined based on an identifier of data indicating a file name received together with a "get" command. For example, in the case where "GET FILE05.TXT" has been received, the read out data is converted to a text format file. The file data stored in the transfer area via the first I/F of the transmission controller 24 is transmitted to the PC 1 (step G16). In the case where the FTP mode is the "z" mode (yes in step G17), arithmetic data is zero-cleared (cleared) from a source file having stored therein the arithmetic data read out in step G5, whereby sales adjustment is carried out, and current processing reverts to step S1 shown in FIG. 9.

As described above, in the "get" processing, an operator specifies a name and a format of a file to be acquired from the PC 1, thereby making it possible to receive the data to be acquired in the PC 1 in a desired file format. If the FTP mode is specified in advance, a user can select and receive required data (such as arithmetic data including sales data, for example). For example, in the case where "GET FILE05.TXT" has been specified, if the "x" or "y" mode is preset as the FTP mode in advance, making it possible to acquire only arithmetic data, i.e., sales quantity or sales amount, contained in the faculty file 231 shown in FIG. 5. The AUTOPGM mode is set as the FTP mode, making it possible for the PC 1 to acquire only set data, i.e., characters or unit price, contained in the faculty file 231 shown in FIG. 5. The "z" mode is set as the FTP mode, and for example, sales data or the like contained in a faculty counting file is specified, making it possible to adjust the sales data from the PC 1 and collect the adjusted sales data on the PC 1.

CD Processing Operation

Now, a description will be given with respect to a CD processing operation.

FIG. 14 is a flowchart showing a CD processing operation executed by the CPU 21 of the master ECR 2*a*. The processing is achieved by a software processing operation under the cooperation between the CPU 21 of the master ECR 2*a* and a CD processing program stored in the recording device 27.

When data indicating types of a CD command and the FTP mode has been received from the PC 1, a name of the received operating mode is stored in the FTP mode storage memory of the RAM 23 (step C1), and current processing reverts to step S1 shown in FIG. 9.

Reference is made to the FTP mode stored in the FTP storage memory of the RAM 23 when a processing operation is carried out in response to another command received from the PC 1, and the processing operation in response to this FTP mode is executed.

For example, in the case where data indicating the CD command and FTP mode called "CD AUTOPGM" has been received from the PC 1, data indicating "AUTOPGM" is stored in the FTP mode storage memory. In this manner, it becomes possible to carry out a processing operation in response to a set mode, the operation reading out only the set data contained in a file having the specified file name and transmitting the data to the PC 1.

DIR Processing Operation

Now, a description will be given with respect to a DIR processing operation.

FIG. 15 is a flowchart showing a DIR processing operation executed by the CPU 21 of the master ECR 2*a*. The processing is achieved by a software processing operation under the cooperation between the CPU 21 of the master ECR 2*a* and a DIR processing program stored in the recording device 27.

When a DIR command for browsing a directory contained in a file storage memory of the RAM 23 has been received from the PC 1, reference is made to a DIR table stored in the RAM 23 (step D1). Then, based on the contents of the DIR table, the file data contained in each file stored in a file storage memory is classified in accordance with whether or not its contents can be accessed in each FTP mode, and a virtual directory for storing data whose file name can be accessed in that mode is created by the FTP mode (step D2). The data having a file name in the virtual directory that corresponds to a current FTP mode stored in the FTP mode storage memory is converted into a format such that the data can be output by the PC 1 (step D3). The thus converted data is transmitted to the PC 1 via the first I/F of the transmission controller 24 (step D4), and current processing reverts to step S1 shown in FIG. 9.

In the case where a DIR command is received without specifying FTP mode by a CD command, as shown in FIG. 16A, in step D3, data indicating a list of virtual directories created in step D2 is converted into a format such that the data can be output by the PC 1, and the converted data is transmitted to the PC 1.

At the PC 1, the data having a file name of a file that can be accessed in a current FTP mode of the master ECR 2*a* can be acquired by the DIR command. Thus, by outputting the data received by a display device or a printer and the like, an operator of the PC 1 can browse a list of file names that can be accessed in the current FTP mode of the master ECR 2*a*.

For example, as shown in FIG. 16B, if the DIR command is transmitted after the AUTOPGM mode has been specified by the CD command from the PC 1, it becomes possible to display a list of file names that can be accessed in the AUTOPGM mode.

Similarly, as shown in FIGS. 16C, 16D, and 16E, it becomes possible to display a list of file names that can be accessed in the "x" mode, "z" mode, or JOB mode.

Example of Processing Sequence Using FTP Command

Figure 17:
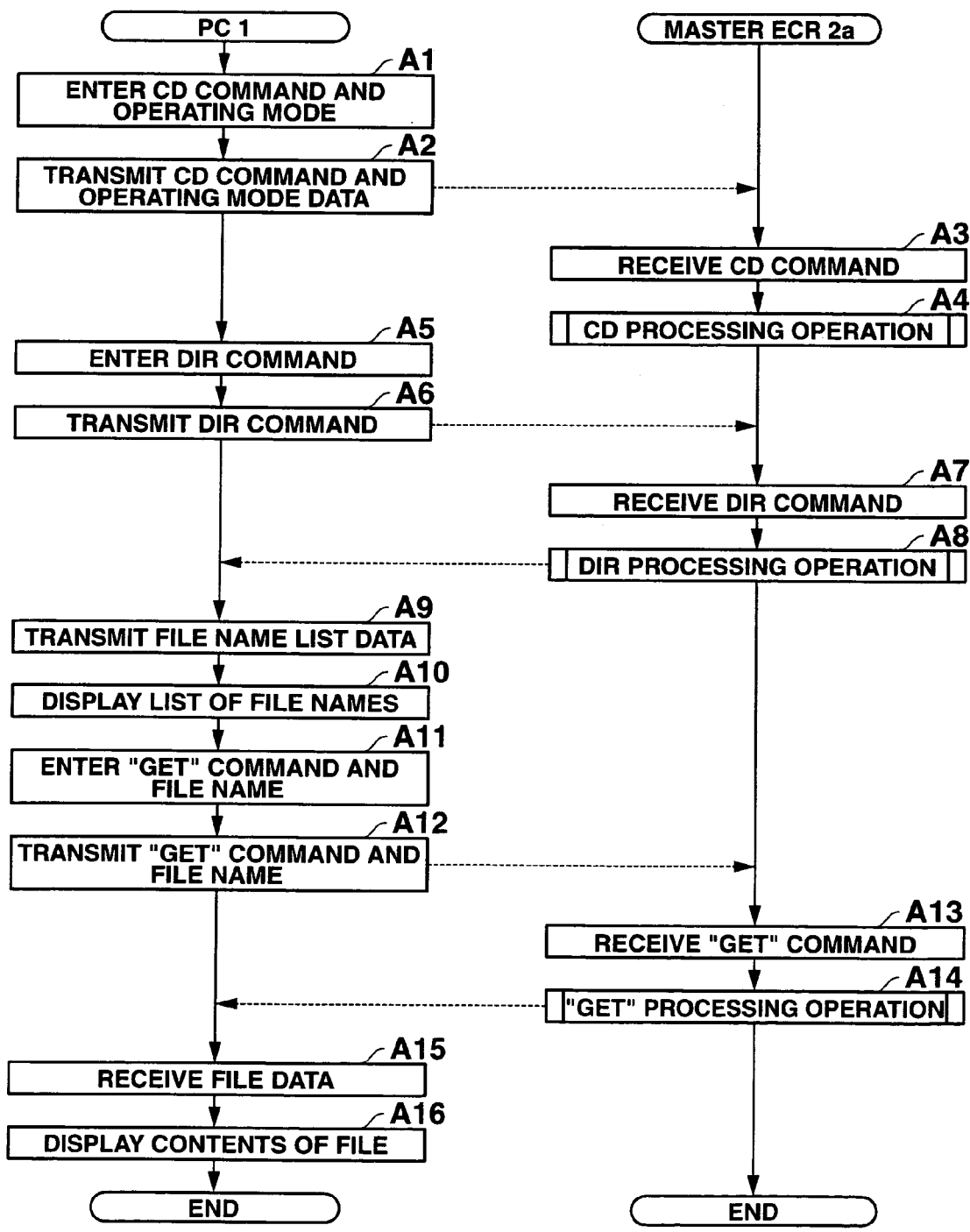
FIG. 17 is a view showing a processing sequence between the PC 1 and a master ECR 2a using command transmission or receiving in accordance with the FTP protocol.

Now, with reference to FIG. 17, a description will be given with respect to an example of a processing sequence between the PC 1 and the master ECR 2*a* using command transmission and reception in accordance with the FTP protocol. FIG. 17 shows an example of a sequence for specifying the FTP mode in the master ECR 2*a* from the PC 1 by a CD command; acquiring and displaying a list of file names that can be accessed in the specified FTP mode by a DIR command; and specifying a file name by a "get" command, thereby acquiring and displaying the contents of the specified file.

In the PC 1, when an operator inputs data indicating the CD command and FTP mode via the input device 12 (step A1), the input CD command and FTP mode data are transmitted to the master ECR 2*a* (step A2).

In the master ECR 2*a*, when the CD command has been received via the first I/F of the transmission controller 24 (step A3), a CD processing operation described in FIG. 14 is executed; and the CD command and the received FTP mode data are stored in the FTP mode storage memory (step A4).

After the FTP mode of the master ECR 2 has been changed, if an operator inputs a DIR command via the input device 12 in the PC 1 (step A5), the DIR command is transmitted to the master ECR 2a via the transmission controller 14 (step A6).

In the master ECR 2a, when the DIR command has been received via the first I/F of the transmission controller 24 (step A7), a DIR processing operation shown in FIG. 15 is executed; data having a file name that can be accessed in the FTP mode stored in FTP mode storage memory is generated; and the generated data is transmitted to the PC 1 (step A8).

In the PC 1, when data having a file name has been received from the master ECR 2a (step A9), a list of file names is displayed on the display device 15 (step A10). When an operator inputs a "get" command and a file name via the input device 12 (step A11), the data on the input "get" command and file name is transmitted to the master ECR 2a (step A12).

In the master ECR 2a, when the "get" command and the file name data have been received (step A13), a "get" processing operation described in FIG. 13 is executed; the data based on the FTP mode is read out from a file that corresponds to the received file name together with the "get" command; the read out data is converted to the file data conforming to the specified file format; and the converted data is transmitted to the PC 1 (step A14).

In the PC 1, when the file data has been received (step A15), the contents of the file data are displayed on the display device 15 (step A15).

In accordance with the above-described procedures, required file data contained in the master ECR 2a is acquired from the PC 1, and the acquired data can be displayed on the display device 15.

Figure 18:
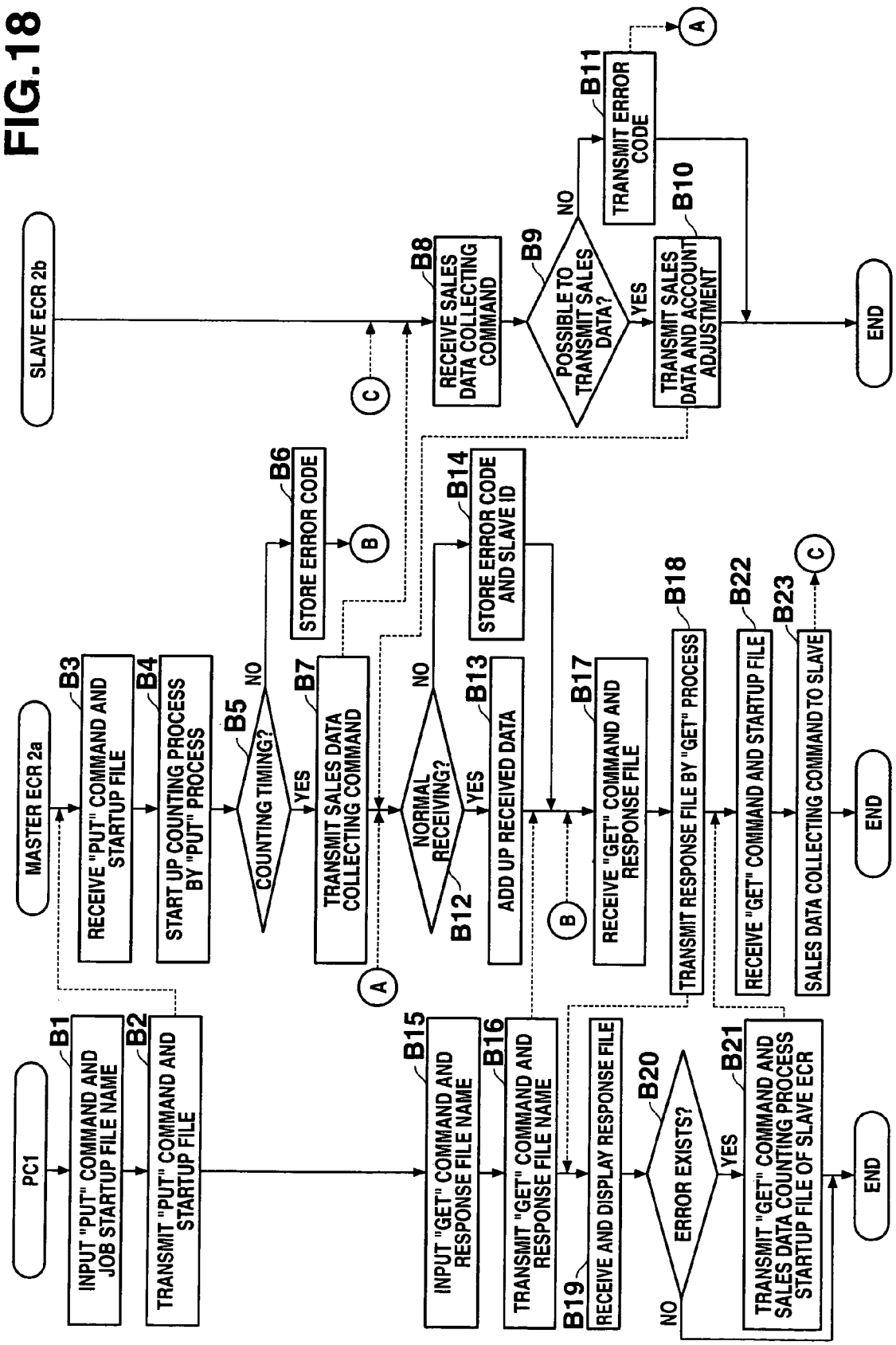

Example of Sequence of the Master ECR 2a and the Slave ECR 2b During Counting Processing Operation Startup In the case where counting processing operation startup of a variety of files has been received by a "put" command from the PC 1, it is necessary for the master ECR 2a to collect sales data from the slave ECR 2b. FIG. 18 shows an example of a processing sequence between the PC 1, master ECR 2a, and slave ECR 2b when counting processing operation startup has been carried out by the "put" command from the PC 1 to the master ECR 2a. Hereinafter, a description will be given with respect to a processing sequence shown in FIG. 18. Although the slave ECR 2b is illustrated as one device, the master ECR 2a carries out a sequence similar to each slave ECR 2b connected to the communication network N2.

In the PC 1, when an operator inputs a name of a startup file having stored therein counting processing operation startup commands via the input device 12, i.e., a "put" command and a counting processing operation startup command (step B1), the "put" command and the startup file data having the input name are transmitted to the master ECR 2a (step B2).

In the master ECR 2a, when the "put" command and startup file have been received via the first I/F of the transmission controller 24 (step B3), a "put" processing operation described in FIG. 1 is executed. Then, a counting processing operation of files specified in the startup file is started up (step B4), and it is determined whether or not a currently countable timing is established (step B5). For example, a counting processing operation cannot be started up until a predetermined time elapses, for example, until a shop is closed and closing has terminated. If it is determined that the countable timing is not established (yes in step B6), an error code indicating the fact is stored in the response file 236. In the case where it is determined that the countable timing is established (yes in step B5), a sales data collecting command of a specified file is transmitted to the slave ECR 2b (step B7).

In the slave ECR 2b, when the sales data collecting command has been received from the master ECR 2a (step B8), it is determined whether or not sales data transmission is enabled. In the case where it is determined that the transmission is enabled (yes in step B9), the sales data contained in the file specified by the master ECR 2a is transmitted; the sales data contained in that file is zero-cleared; and sales adjustment is carried out (step B10). In the case where transmission of the sales data is disabled (for example, in the case where power is OFF, and a registering operation is in progress) (no in step B9), an error code according to the state is transmitted to the master ECR 2a (step B11).

In the master ECR 2a, when sales data has been normally received (yes in step B12), the received sales data is added in an accumulated manner in a counting file that corresponds to the specified file (step B13). In the case where the sales data is not normally received, and an error code has been received (no in step B12), a slave ID of a transmission source and the received error code are stored in the response file 236 (step B14).

When the PC 1 inputs a processing result receiving command, i.e., a "get" command and a file name of the response file (step B15), the "get" command and data on a file name of the response file are transmitted to the master ECR 2a (step B16).

In the master ECR 2a, when the "get" command and the data on a file name of the response file have been received from the PC 1 (step B17), the "get" processing operation is carried out; the response file 236 is read out; the read out data is converted into a format that can be output by the PC 1; and the converted data is transmitted to the PC 1 (step B18).

In the PC 1, when the response file 236 has been received, the received file is displayed on the display device 15 (step B19). If the response file does not include an error code (no in step B20), this processing operation terminates. In the case where the file includes an error code (yes in step B20), a startup file is generated while a startup command is handled as data, the command being adapted to sales data collection processing to be retried for the slave ECR 2b corresponding to the error code, and the generated file is transmitted to the master ECR 2a together with the "put" command (step B21).

In the master ECR 2a, when the "put" command and the startup file data have been received from the PC 1 (step B22), a sales data collecting command is retransmitted to the slave ECR 2b based on the contents of the startup file (step B23). In the slave ECR 2b, when the sales collecting command has been received, a processing operation from step B8 is re-executed.

In accordance with the above-described sequence, the PC 1 can cause the master ECR 2a to carry out repeated data collection until no error slave ECR 2b is found.

As has been described above, with the master ECR 2a according to the present embodiment, upon the receipt of data indicating a file name transmitted from the PC 1, data on the received file name is determined; the data according to the determined file name is read out from the file storage memory of the RAM 23; the read out data is converted to file data conforming to a format specified by the received file name; and the thus converted file data is transmitted to the PC 1. Therefore, on the PC 1, merely by transmitting a file name of data to be acquired from the master ECR 2a, it becomes possible to receive the data according to the transmitted file name in a data format specified by the PC 1, the data being stored in the file storage memory of the master ECR 2a.

When the master ECR 2a is in a non-processing state, the master ECR 2a reads from the file storage memory the data according to the file name transmitted from the PC 1, thus making it possible to prevent an error such as transmission of unidentified data to the PC 1 during data processing.

According to the master ECR 2a, when a command for specifying an operating mode of the master ECR 2a has been received at the time of communication based on FTP protocol from the PC 1, only the data is read out in response to the operating mode specified from among the file data according to the determined file name; the read out data is converted to file data conforming to a format specified by the file name; and the converted file data is transmitted to the PC 1. Therefore, it becomes possible to acquire only the required data in response to the operating mode from among the file data specified on the PC 1.

According to the master ECR 2a, a "z" mode is specified from the PC 1, and a file name of sales data is transmitted, thereby making it possible to acquire the sales data and making it possible for the master ECR 2a to adjust the sales data.

According to the master ECR 2a, it is determined whether or not an operator in the master ECR 2a is a responsible person authorized for sales adjustment, and it becomes possible to make sales adjustment only when the operator is the authorized responsible person, and thus, data security can be ensured.

According to the master ECR 2a, the file data transmitted from the PC 1 is received; the file name and data contents of the received file data are determined; and each one of the data contained in the received file is written after converted to a predetermined ECR format in a region that corresponds to the file name and data contents determined in the file storage memory. Therefore, the file data transmitted from the PC 1 can be written in a proper format determined in the master ECR 2a.

According to the master ECR 2a, when a non-processing state is established, the received file data is written, thus making it possible to prevent an error from occurring during another processing operation in the master ECR 2a.

In the above-described embodiment, it has been assumed that, by specifying an FTP mode in advance, in the "get" processing operation, only the data in response to the specified FTP mode is read out from among the file data that corresponds to the received file name. For example, when a file name is specified from the PC 1, an identification code indicating desired data is added to a file name, and the code added file name is transmitted, and only the data according to the identification code is read out from a file that corresponds to the file name received from the PC 1, whereby the read out data may be transmitted to the PC 1. For example, in the case where "FILE005X.TXT" has been specified as a file name, only the data on sales quantity and sales amount that can be accessed in the "x" mode may be transmitted from the faculty file 231 (FILE005.DAT).

With the master ECR 2a according to the present embodiment, upon the receipt of a command transmitted from the PC 1, in the case where the received command is a command for browsing a directory of the file storage memory of the RAM 23, the file data stored in the file storage memory is classified by an FTP mode in accordance with whether or not the stored file data is the content that can be accessed in that FTP mode. Then, a virtual directory for storing a file name of a file that can be accessed in that mode is created, and the data indicating a name of the created virtual directory is transmitted to the PC 1. Therefore, from the PC 1, reference can be made to the file names stored in the master ECR 2a by the contents of the files that can be accessed in each FTP mode.

In the case where a command for specifying any of the virtual directories by the created FTP mode and a command for browsing a list of files in the specified virtual directory have been received from the PC 1, the master ECR 2a transmits to the PC 1 the file names in the virtual directory in any one of the specified FTP mode. Therefore, it becomes possible to specify an FTP mode from the PC 1 and to obtain a list of file names that corresponds to the contents of the files that can be browsed in the specified FTP mode.

In the case where a file name and a command for requesting file data on the file name have been received from the PC 1, the master ECR 2a transmits to the PC 1 the file data on the received file name. Therefore, it becomes possible to easily acquire the file data on the desired contents at the PC 1.

With the master ECR 2a according to the present invention, the file data transmitted from the PC 1 is received; a type of a command contained in the received command is determined; and a processing operation is started up in response to the type of the determined command. Therefore, it becomes possible for the master ECR 2a to execute a processing operation of a desired function by file transmission from the PC 1.

When the master ECR 2a is in a non-processing state, processing operation startup is carried out according to the type of the determined command. Thus, it is possible to prevent an error such as starting up a job during registering process and the like by the master ECR 2a, and transmitting unconfirmed data, still under data processing, to a server.

The result of the processing is converted into file data in a format capable of being output by the PC 1, and the converted data is transmitted to the PC 1. Therefore, it is possible to check the result on the PC 1.

In addition, it is determined whether or not an operator in the master ECR 2a is a responsible person authorized for processing operation startup. In the case where the operator is a responsible person authorized for processing operation startup, such an authorized responsible person is caused to start up that processing operation, thus making it possible to prevent an illegal end of a job due to an incorrect operation of a general clerk.

MODIFIED EXAMPLE

Figure 19:
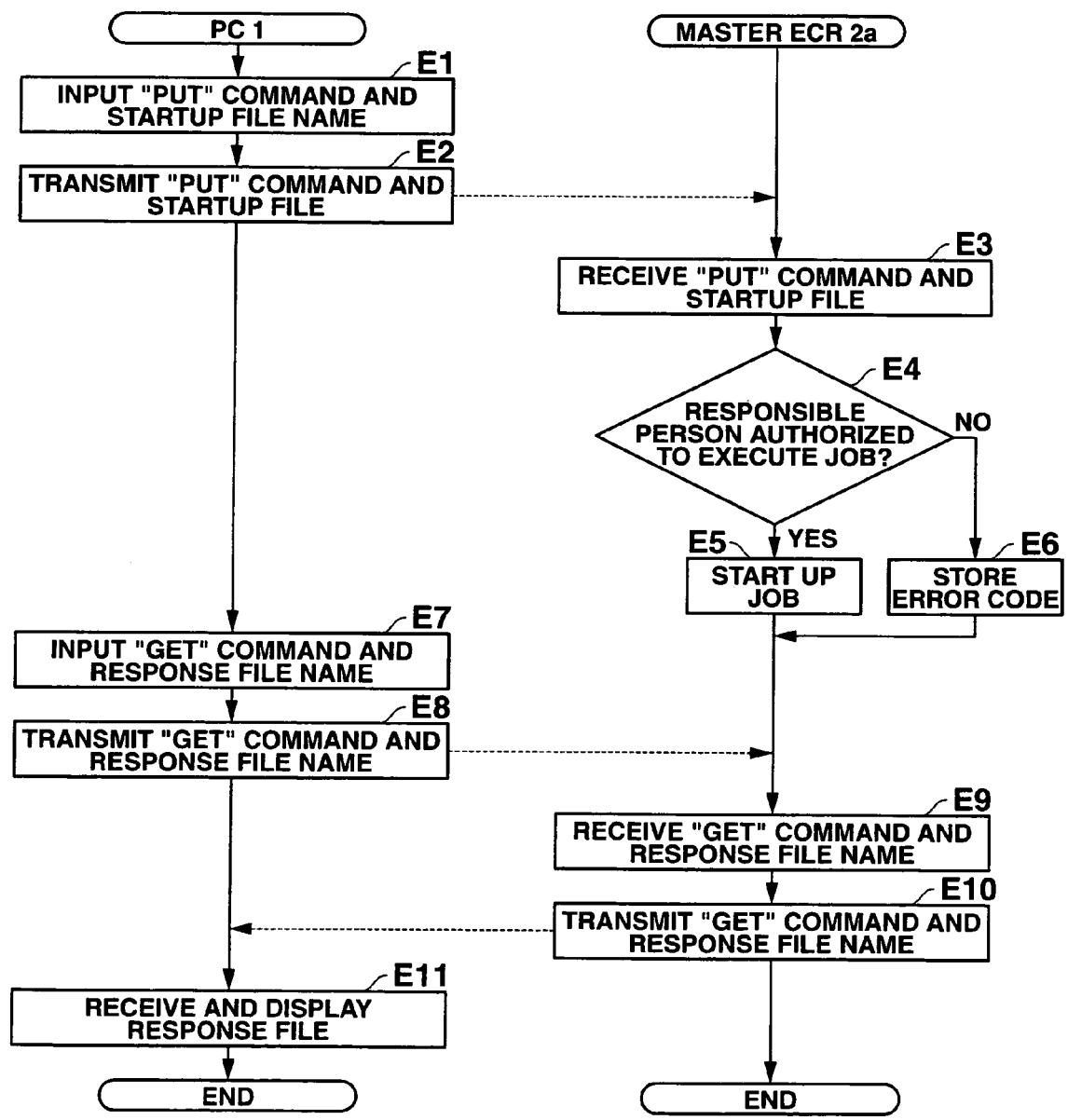
FIG. 19 is a view showing a modified example of a series of the processing operations described above.

FIG. 19 shows, as a modified example of a series of processing operations described above, a sequence in which, when a job startup command has been transmitted from the PC 1 to the master ECR 2a by means of the FTP, in the master ECR 2a, a current operator of the master ECR 2a adds responsible person judgment means for discriminating whether or not the operator is a responsible person authorized to execute a job, and job startup from the PC 1 is handled as an error if the operator is not such an authorized responsible person.

In the PC 1, when an operator inputs a job startup command via the input device 12, i.e., a name of a file having stored therein a "put" command and the job startup command (step E1), the "put" command and the data on a startup file of the input name are transmitted to the master ECR 2a (step E2).

In the master ECR 2a, when the "put" command and startup file have been received via the first I/F of the transmission controller 24 (step E3), it is determined whether or not an operator in a current master ECR 2a (an operator specified by a clerk key, a responsible person code being stored in a responsible person memory) is a responsible person authorized to execute a job specified by the startup file. In the case where the operator is the responsible person authorized to execute the specified job (yes in step E4), the job is started up in accordance with a command of the startup file (step E5). In the case where it is determined that the current operator is not the person authorized to execute the job specified by the startup file (no in step E4), an error code indicating a responsible person error is stored in the response file 236 (step E6).

In the PC 1, when an operator inputs a processing result receiving command via the input device 12, i.e., a "get" command and a file name of the response file (step E7), the "get" command and the data on the file name of the response file are transmitted to the master ECR 2a (step E8).

In the master ECR 2a, when the "get" command and data on the file name of the response file have been received from the PC 1 (step E9), a "get" processing operation is executed; the response file 236 is read out; the read out file is converted to a format that can be output by the PC 1; and the converted file is transmitted to the PC 1 (step E10).

In the PC 1, when the response file 236 has been received, the contents of the response file is displayed on the display device 15 (step E11), and the current processing operation terminates.

In accordance with the above-described sequence, only in the case where the operator on the master ECR 2a is a responsible person authorized to execute the job specified from the PC 1, for example, a responsible shop person or the like, it becomes possible to execute the specified job. In addition, it becomes possible to prevent an illegal end of the job due to an incorrect operation of a general clerk or the like and to ensure the security of data contained in the master ECR 2a.

While the above modified example has assumed that, when the job startup command has been received, it is determined whether or not the responsible person is an authorized responsible person, such a responsible person may be restricted similarly when an instruction has been supplied to move a current mode to the "z" mode including erasure (clearing) of sales data.

According to a first aspect of the present invention, there is provided a data processing apparatus capable of transmitting or receiving file data to or from a server, the apparatus comprising:

a memory which stores file data;

a receiver which receives file name data transmitted from the server;

a conversion unit which reads from the memory file data which is indicated by the received file name data, and converts the read file data to file data conforming to a format specified by the file name data; and a transmitter which transmits the converted file data to the server.

Thus, when the data processing apparatus, capable of transmitting or receiving file data to or from the server, receives data indicating a file name transmitted from the server, the received file name data is detected; data according to the detected file name is read out from the memory; read out data is converted into file data of a format specified by the received file name; and the converted file data is transmitted to the server. Therefore, it is possible for the server to receive data according to the transmitted file name, which is stored in the memory of the data processing apparatus, in a data format specified by the server, by merely transmitting a file name of data to be obtained from the data processing apparatus.

According to a second aspect of the present invention, there is provided a data processing apparatus capable of transmitting or receiving file data to or from a server, the apparatus comprising:

a memory which stores file data;

a receiver which receives a command transmitted from the server;

a control unit which, when the receiver receives a command for browsing a directory of the memory, classifies file data stored in the memory based on file contents, creates virtual directories including file names by classified file data, and transmits data indicating names of the created virtual directories to the server.

Thus, when the data processing apparatus, capable of transmitting or receiving file data to or from the server, receives a command transmitted from the server, and the received command is a command for browsing a directory of the memory, the file data stored in the memory is classified by the file contents; a virtual directory for storing file names by the file contents is created; and data indicating a name of the created virtual directory is transmitted to the server. Therefore, a reference can be made to the file names stored in the data processing apparatus from the server depending on the file contents.

According to a third aspect of the present invention, there is provided a data processing apparatus capable of transmitting or receiving file data to or from a server, the apparatus comprising:

a receiver which receives file name data transmitted from the server; and a control unit which detect a type of a command in the received file, and starts up a processing operation according to the type of the command.

Thus, the data processing apparatus executes a processing operation of a desired function from the server side after a file has been transmitted or received between the data processing apparatus and the server by using a general-purpose protocol.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. An electronic cash register which transmits a data file to a server by using a file transfer protocol and receives a data file from the server by using the file transfer protocol, the electronic cash register comprising:

a storage unit configured to store sales data;

a receiver configured to receive the data file and a command for getting the sales data from the server by using the file transfer protocol;

a memory configured to store mode information which is transmitted from the server and indicates an inspection mode or a sales adjustment mode;

a reading module configured to read the sales data from the storage unit in accordance with whether the mode information stored in the memory indicates an inspection mode or a sales adjustment mode, the sales data being read in a file format based on a name of the data file transmitted from the server by using the file transfer protocol, when the receiver receives the command for getting the sales data; and a transmitter configured to transmit the sales data read by the reading module to the server;

wherein the reading module is configured to delete the sales data from the storage unit in order to carry out sales adjustment after reading the sales data when the mode information stored in the memory indicates the sales adjustment mode; and wherein the electronic cash register further comprises a determining module configured to determine whether an operator is a responsible person authorized for sales adjustment, and wherein the reading module is configured to delete the sales data when the determining module determines that the operator is the responsible person.

2. A non-transitory computer readable storage medium having a program stored thereon for an electronic cash register which transmits a data file to a server by using a file transfer protocol and receives a data file from the server by using the file transfer protocol, the program controlling the cash register to perform functions comprising:

storing sales data;

receiving the data file and a command for getting the sales data from the server by using the file transfer protocol;

storing mode information which is transmitted from the server and indicates an inspection mode or a sales adjustment mode;

reading the stored sales data in accordance with whether the stored mode information indicates an inspection mode or a sales adjustment mode, the sales data being read in a file format based on a name of the data file transmitted from the server by using the file transfer protocol, when the command is received for getting the sales data;

transmitting the read sales data to the server;

deleting the stored sales data in order to carry out sales adjustment after reading the sales data when the stored mode information indicates the sales adjustment mode; and determining whether an operator is a responsible person authorized for sales adjustment, wherein the deleting of the sales data is performed when it is determined that the operator is the responsible person.

3. An electronic cash register which transmits a data file to a server by using a file transfer protocol and receives a data file from the server by using the file transfer protocol, the electronic cash register comprising:

a sales data storage unit configured to store sales data files;

a setting mode storage module configured to set and store a sales data file in the sales data storage unit which can be accessed by the server for predetermined modes;

an operation mode storage module configured to store operation mode information transmitted from the server;

a controller configured to create a virtual directory file for the sales data file in the sales data storage unit which can be accessed by the server in an operation mode indicated by the operation mode information stored in the operation mode storage module when a command transmitted from the server by using the file transfer protocol indicates a command for browsing the sales data storage unit;

a transmitter configured to transmit the virtual directory file created by the controller to the server when the command transmitted from the server by using the file transfer protocol indicates the command for browsing the sales data storage unit; and a reading module configured to read a sales data file from the sales data storage unit in accordance with the operation mode information transmitted from the server, the sales data being read in a file format based on a name of the data file transmitted from the server by using the file transfer protocol, when a command for getting a sales data file is transmitted from the server;

wherein the transmitter is configured to transmit the sales data file read by the reading module to the server;

wherein the reading module is configured to delete the sales data file from the sales data storage unit in order to carry out sales adjustment after reading the sales data file when the operation mode information transmitted from the server indicates a sales adjustment mode; and wherein the electronic cash register further comprises a determining module configured to determine whether an operator is a responsible person authorized for sales adjustment, and wherein the reading module is configured to delete the sales data file when the determining module determines that the operator is the responsible person.

4. The electronic cash register according to claim 3, wherein the controller is configured to create a virtual directory file indicating the predetermined modes when the command transmitted from the server indicates the command for browsing the sales data storage unit and the server does not specify an operation mode.

5. A non-transitory computer-readable storage medium having a program stored thereon for an electronic cash register which transmits a data file to a server by using a file transfer protocol and receives a data file from the server by using the file transfer protocol, the program controlling the electronic cash register to perform functions comprising:

storing sales data files;

setting and storing a sales data file which can be accessed by the server for predetermined modes;

storing operation mode information transmitted from the server;

creating a virtual directory file for the sales data file which can be accessed by the server in an operation mode indicated by the stored operation mode information when a command transmitted from the server by using the file transfer protocol indicates a command for browsing the stored sales data;

transmitting the created virtual directory file to the server when the command transmitted from the server by using the file transfer protocol indicates the command for browsing the sales data storage unit;

reading a stored sales data file in accordance with the operation mode information transmitted from the server, the sales data being read in a file format based on a name of the data file transmitted from the server by using the file transfer protocol, when a command for getting a sales data file is transmitted from the server;

transmitting the read sales data file to the server;

deleting the stored sales data file in order to carry out sales adjustment after reading the sales data file when the operation mode information transmitted from the server indicates a sales adjustment mode; and determining whether an operator is a responsible person authorized for sales adjustment, wherein the deleting of the sales data file is performed when it is determined that the operator is the responsible person.

* * * * *